United States Patent
Baglin et al.

(10) Patent No.: US 8,248,915 B2
(45) Date of Patent: Aug. 21, 2012

(54) REDUNDANT SESSION INFORMATION FOR A DISTRIBUTED NETWORK

(75) Inventors: Vincent B. Baglin, San Diego, CA (US); Prakash Surendranadhan, San Diego, CA (US); Srinivasan Balasubramanian, San Diego, CA (US); Sanjeevan Sivalingham, San Diego, CA (US); Erik Colban, San Diego, CA (US); Yingzhe Wu, San Marcos, CA (US); Prashanth Sharma, San Diego, CA (US); Hai Le, Plano, TX (US); Rath Vannithamby, San Diego, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1850 days.

(21) Appl. No.: 11/323,321

(22) Filed: Dec. 30, 2005

(65) Prior Publication Data

US 2007/0153675 A1 Jul. 5, 2007

(51) Int. Cl.
*G01R 31/08* (2006.01)

(52) U.S. Cl. .................................. 370/217; 370/219

(58) Field of Classification Search .............. 370/235, 370/217, 219
See application file for complete search history.

(56) References Cited

U.S. PATENT DOCUMENTS

| | | | | |
|---|---|---|---|---|
| 4,995,035 | A * | 2/1991 | Cole et al. | 370/254 |
| 5,313,388 | A | 5/1994 | Cortis | |
| 6,894,994 | B1 * | 5/2005 | Grob et al. | 370/335 |
| 7,219,254 | B2 | 5/2007 | Rathunde et al. | |
| 7,289,433 | B1 * | 10/2007 | Chmara et al. | 370/219 |
| 2002/0188527 | A1 | 12/2002 | Dillard et al. | |
| 2003/0123420 | A1 | 7/2003 | Sherlock | |
| 2003/0135626 | A1 | 7/2003 | Ray et al. | |
| 2003/0235168 | A1 * | 12/2003 | Sharma et al. | 370/338 |
| 2004/0015607 | A1 * | 1/2004 | Bender et al. | 709/238 |
| 2004/0071090 | A1 | 4/2004 | Corson et al. | |
| 2004/0109423 | A1 | 6/2004 | Sayeedi et al. | |
| 2004/0165551 | A1 | 8/2004 | Krishnamurthi et al. | |
| 2004/0246933 | A1 * | 12/2004 | Valko et al. | 370/338 |
| 2005/0117598 | A1 * | 6/2005 | Iijima et al. | 370/412 |
| 2005/0249131 | A1 | 11/2005 | Takahashi et al. | |
| 2006/0058056 | A1 | 3/2006 | Das et al. | |
| 2006/0099950 | A1 * | 5/2006 | Klein et al. | 455/439 |
| 2006/0099973 | A1 | 5/2006 | Nair et al. | |
| 2006/0198346 | A1 | 9/2006 | Liu et al. | |
| 2007/0064948 | A1 * | 3/2007 | Tsirtsis et al. | 380/270 |
| 2007/0116020 | A1 * | 5/2007 | Cheever et al. | 370/401 |
| 2007/0153676 | A1 | 7/2007 | Baglin et al. | |
| 2007/0153720 | A1 | 7/2007 | Baglin et al. | |
| 2007/0153750 | A1 | 7/2007 | Baglin et al. | |
| 2007/0153753 | A1 | 7/2007 | Comstock et al. | |
| 2007/0165580 | A1 | 7/2007 | Ebata | |
| 2007/0253328 | A1 * | 11/2007 | Harper et al. | 370/219 |

\* cited by examiner

*Primary Examiner* — Sai-Ming Chan
(74) *Attorney, Agent, or Firm* — Coats & Bennett, P.L.L.C.

(57) ABSTRACT

A mobile communication network includes a plurality of access nodes that can serve different roles in support of a communication session with a mobile station. An access node can serve as a connecting node that receives access requests the mobile station, as an anchor node to anchor a radio packet connection with a core network for the communication session; or as a primary node to store session information for the communication session. When the communication session is established, the anchor node for the communication session may select another access node to serve as the primary node. Session information can be stored at both the anchor node and primary node so that data can be delivered to the mobile station if either one of the anchor node and primary node are available.

34 Claims, 21 Drawing Sheets

REDUNDANT SESSION INFORMATION FOR A DISTRIBUTED NETWORK

BACKGROUND

The present invention relates generally to mobile communication networks and more particularly, to mobile communication networks having a distributed architecture.

Most radio access networks (RANs) employed today use a hierarchical network architecture in which each higher level entity supports multiple lower level entities. HRPD networks according to the Third Generation Partnership Project 2 (3GPP2) standard exemplify this type of hierarchical network. In HRPD networks, a packet control function performing session control and mobility management functions connects multiple base station controllers (also known as access node controllers) to the core network. Each base station controller, in turn, connects to multiple radio base stations and performs radio resource control functions. The radio base stations communicate over the air interface with the mobile stations. This conventional hierarchical architecture has worked well for voice services and most packet data services.

Recently, there has been some interest in developing a distributed RAN architecture in which the radio base station, base station controller, and packet control function are integrated into a single network entity with a connection to the PDSN. These all-in-one nodes help reduce the amount of hardware in the network by taking advantage of spare processing capacity in the radio base station. In the new distributed architecture, functions traditionally performed by centralized nodes, such as session management and mobility management, are distributed among a plurality of network nodes. Thus, a distributed architecture requires coordination between nodes to perform functions such as session management and mobility management.

SUMMARY

A mobile communication network comprises a plurality of access nodes, each of which includes a transceiver system for communicating with mobile stations and a control circuit for controlling operation of said access node. Each access node is capable of acting in a variety of roles to support a communication session with a mobile station. An access node can serve as a connecting node that receives access requests from the mobile station, as a serving node for transmitting packet data over a forward traffic channel to the mobile station, as an anchor node to anchor a radio packet connection with a core network for the communication session; or as a primary node to store session information for the communication session. Monitoring nodes in the mobile communication network monitor the availability of the access nodes and notify other access nodes when one becomes unavailable. In some embodiments, an access node may also serve as a secondary node to enable recovery of session information by a connecting node when a primary node is unavailable.

An access node assuming the role of an anchor node during session establishment requests another access node to serve as a primary node for the communication session. The selection of the primary node may be randomly made or made in a predetermined manner to distribute the session management load among all of the access nodes in the network. The selected primary node allocates a mobile station identifier, which is forwarded to the anchor node and then to the mobile station. The anchor node transfers session information to the primary node to store for the duration of the communication session, while retaining a copy of the session information. The mobile station identifier allocated by the primary node enables other access nodes in the network to determine the location of the session information. The primary node provides session information to other access nodes when requested.

During the communication session, a connecting node may reactivate a communication session for a dormant mobile station while using the primary node to perform session control functions. The connecting node sends a session information request to the primary node responsive to the receipt of a connection request from a mobile station. The connecting node may establish a radio packet connection with the core network to become a new anchor node. The primary node may send an anchor transfer message to the prior anchor node to initiate release of the session information at the prior anchor node.

When the primary node is not available, the connecting node may request session information from another access node serving as either an anchor node or secondary node when the primary node is not available. The secondary node may store the address of the anchor node for the communication session and provide the anchor node address to the connecting node. In this scenario, the anchor node replaces the primary node and provides the session information to other connecting nodes upon request. Alternatively, the anchor node may transfer session information for the communication session to the secondary node when notified that the primary node is unavailable. In this scenario, the secondary node replaces the primary node. In other embodiments, the connecting node may close the communication session when the primary node is not available.

DETAILED DESCRIPTION

Figure 1:
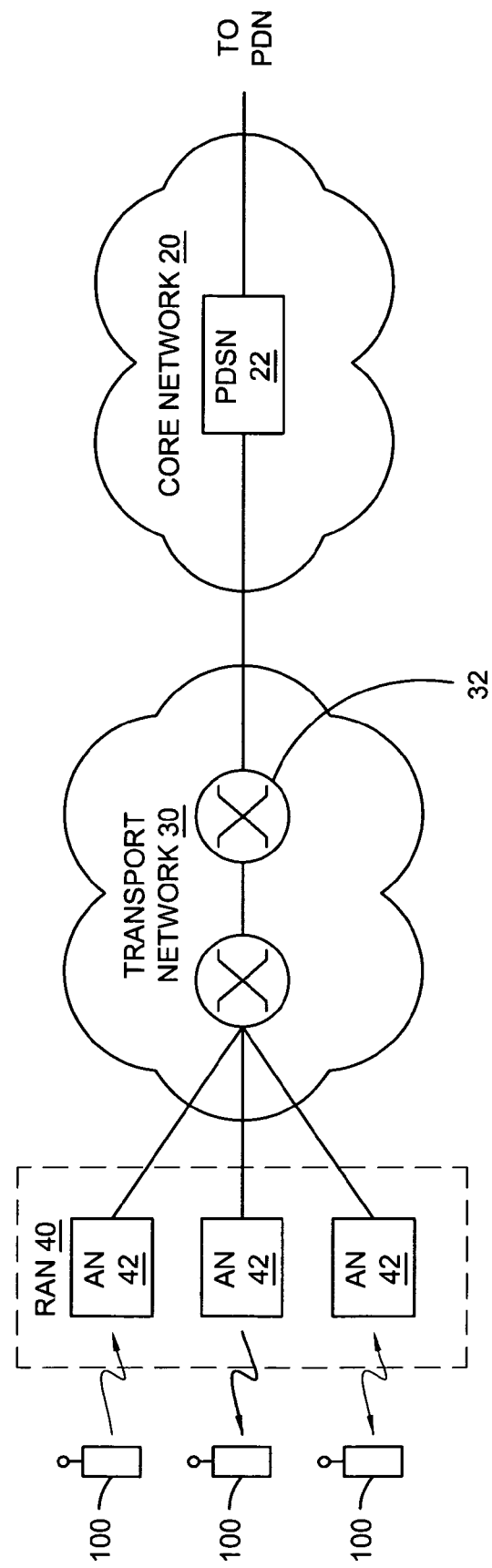
FIG. 1 illustrates an exemplary mobile communication network with a distributed architecture.

FIG. 1 illustrates a mobile communication network 10 according to one embodiment of the invention providing wireless packet data services to a plurality of mobile stations 100. Mobile communication network 10 has a distributed rather than hierarchical architecture. Mobile communication network 10 comprises a packet-switched core network 20 including a Packet Data Serving Node (PDSN) 22, an IP-based transport network 30, and a radio access network 40 comprising one or more access nodes (ANs) 42. The PDSN 22 connects to an external packet data network (PDN) 12, such as the Internet, and supports PPP connections to and from the mobile stations 100. IP streams are added and removed between the ANs 42 and the PDSN 22. The PDSN 22 routes packets between the external packet data network 12 and the ANs 42. The transport network 30 comprises one or more routers 32 and connects the ANs 42 with the core network 20. The ANs 42 comprise base stations that provide the radio connection with the mobile stations 100. The ANs 42 may operate, for example, according to the Telecommunications Industry Association (TIA) standard TIA-856-A (3GPP2 C.S0024-A), which defines an air interface between the AN 42 and mobile stations 100. As will be described in more detail below, the ANs 42, in contrast to conventional networks, incorporate functionality normally performed by higher level nodes in hierarchical systems. Those skilled in the art will appreciate that the present invention may also use in other air interface standards, such as TIA-2000 and the emerging Wideband CDMA standard.

Figure 2:
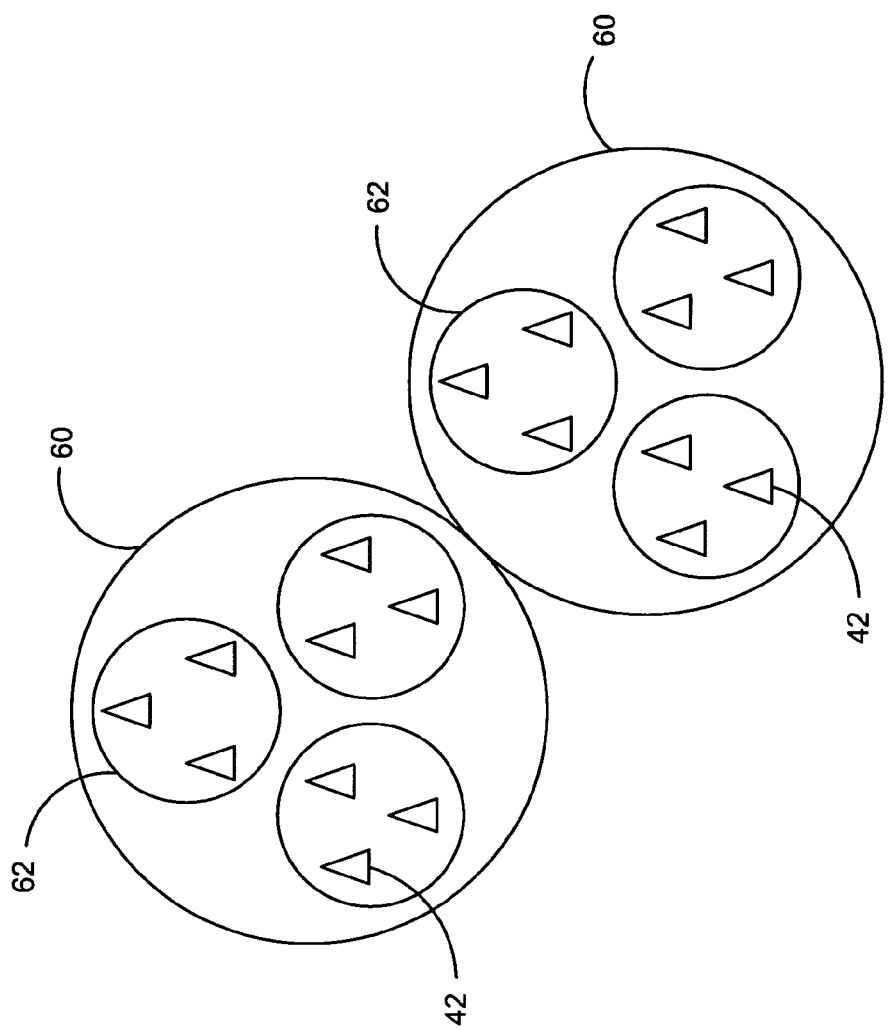
FIG. 2 illustrates grouping of access nodes to form subnets.

The ANs 42 are grouped to form subnets 60 as shown in FIG. 2. Each subnet 60 preferably covers a large area referred to herein as a multicast area. Each subnet 60 is further divided into smaller areas referred to herein as color code areas 62, which may encompass one or more ANs 42.

Figure 3:
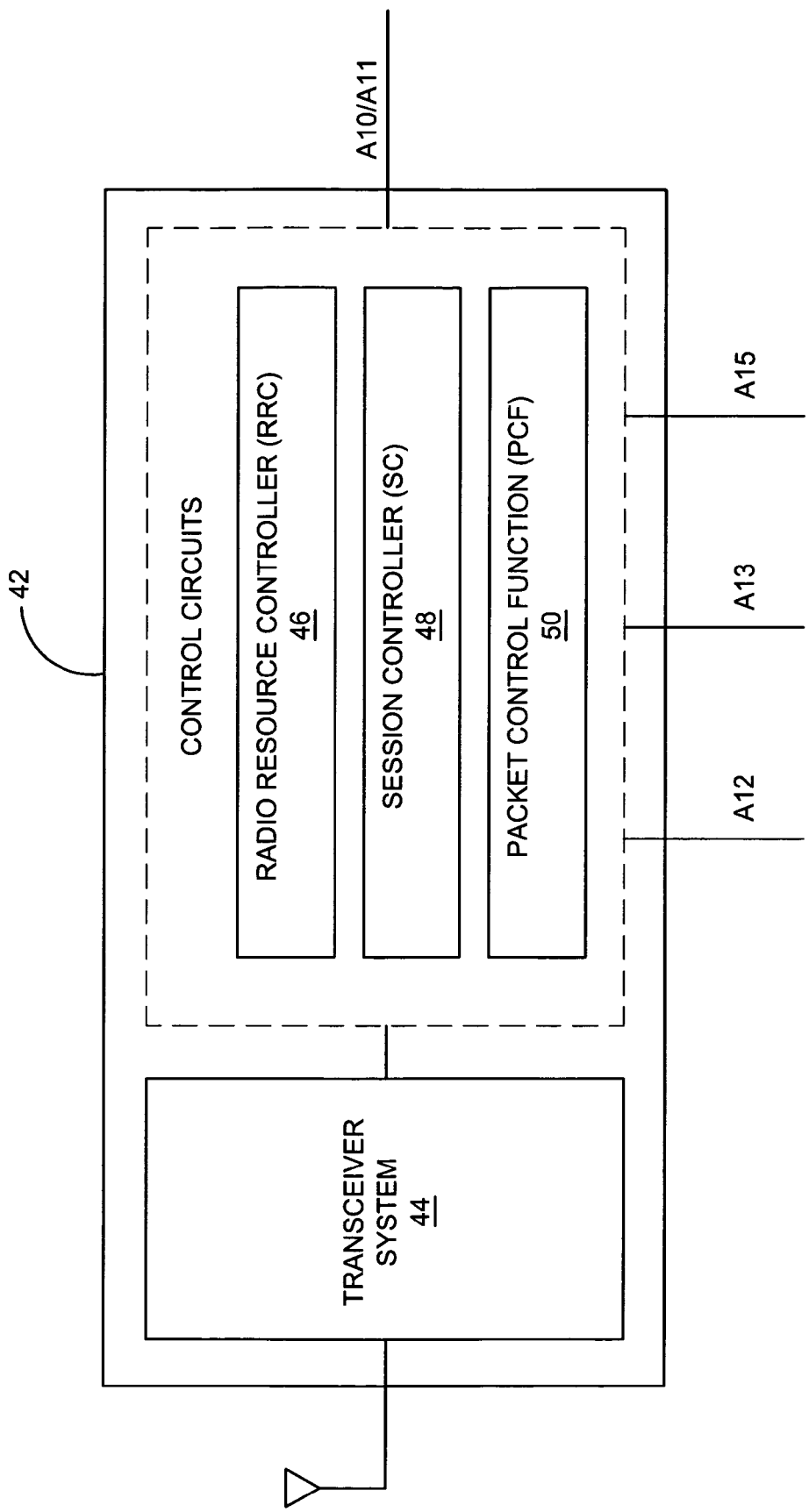
FIG. 3 illustrates logical elements in an exemplary access node for a mobile communication network.

FIG. 3 illustrates the logical elements of an AN 42 in one exemplary embodiment. The exemplary AN 42 comprises a transceiver system 44 and associated control circuits, including a radio resource controller (RRC) 46, a session controller (SC) 48, and a Packet Control Function (PCF) 48 as defined in TIA-1878-1 (3GPP2 A.S0008 v3.0). The transceiver system 44 includes the radio equipment for communicating over the air interface with the mobile stations 100. The radio resource controller 46 manages radio and communication resources for the AN 42. The session controller 48 performs session control and mobility management (SC/MM) functions. The PCF 50 establishes, maintains, and terminates connections from the AN 42 to the PDSN 22. Thus, in contrast to conventional network architectures, the access nodes 42 in the exemplary embodiments integrate the functionality of an access network controller and packet control function as defined in TIA-1878-1 with a radio base station. The access network controller and packet control functions are thus distributed among all of the access nodes 32 rather than residing in a single node or location.

Between the AN 42 and the PDSN 22, the user data travels over the A10 communication link. Generic Routing Encapsulation (GRE) is used to transport data over the A10 connections. GRE is a well-known protocol for encapsulation of an arbitrary network layer protocol over another arbitrary network layer protocol. The GRE protocol is described in the Internet Engineering Task Force (IETF) standard identified as RFC 2784. Signaling data travels between the AN 42 and PDSN 22 over the A11 link. Signaling between the ANs 42 travels over the A13 and A15 communication links. The A13 communication link is used to transfer session information between ANs 42. The A15 communication link is used for inter-AN paging. The AN 42 communicates with an AAA over the A12 communication link to authenticate mobile stations 100 attempting to access the network. The A10, A11, A12, A13 and A15 interfaces are defined in TIA-1878 (3GPP2 A.S0007-A).

To transmit or receive packet data, the mobile station 100 establishes a packet data session with the PDSN 22. For each packet data session, the AN 42 opens one or more radio packet (R-P) connections (also called an A10 connection) with the PDSN 22 to establish a transmission path for user data between the PDSN 22 and AN 42 for packet data. The mobile station 100 negotiates session parameters with the AN 42 and establishes a traffic channel (TCH) with the AN 42 for forward and reverse traffic. The session parameters include the protocols used for communication between the AN 42 and mobile station 100, and the protocol settings. The session parameters are stored by the session controller 48 at the AN 42.

Figure 4:
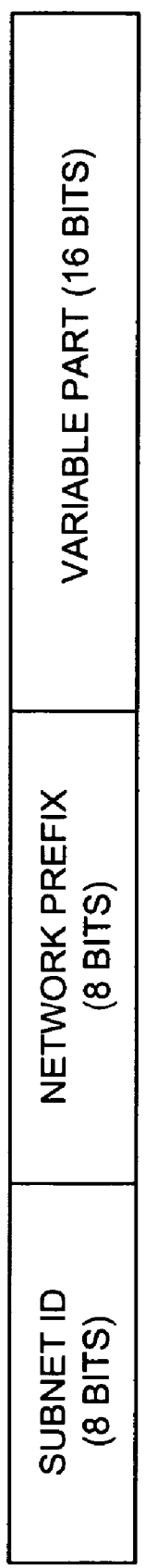
FIG. 4 illustrates the format of an exemplary Universal Access Terminal Identifier.

When the packet data session is established, the mobile station 100 is assigned a Universal Access Terminal Identifier (UATI) to use for the duration of the session. The UATI uniquely identifies the mobile station 100 to the ANs 42 within a subnet 60. In one exemplary embodiment, the UATIs are divided among the ANs 42 in the subnet 60 and have the structure shown in FIG. 4. Thus, each AN 42 has its own pool of UATIs to allocate to mobile stations 100. In the embodiment shown in FIG. 4, the UATI comprises 32 bits. The 16 least significant bits of the UATI are variable and are selected by the AN 42 when an HRPD session is set up. These 16 bits uniquely identify the mobile station 100 to the AN 42. The 8 middle bits are fixed for a given AN 42 and uniquely identify an AN 42 within a given color code area 62. These 8 bits indicate which AN 42 in a color code area is storing the session information. The 8 most significant bits are fixed and uniquely identify a color code area 62 in a subnet 60. If the subnet 60 has a single color code area 62, the 8 bits used to identify the color code area 62 would not be needed. In that case, the length of the variable part could increased to 24 bits rather than 16 bits, or the overall length of the UATI could be reduced to 24 bits In the case where the variable part is 16 bits in length, each AN 42 has approximately 65,000 UATIs to allocate to mobile stations 100. Those skilled in the art will appreciate that additional bits could be used to identify the subnet 60 to provide unique UATIs across the entire network 10.

During the packet data session, the mobile station 100 receives data from only one AN 42 at a time, which is referred to herein as the serving AN. When the mobile station 100 moves between cells, a handover is performed. A handover is a procedure for transferring a session or call from one AN 42 to another. The AN releasing the mobile station during a handover is called the source AN and the AN 42 acquiring the mobile station 100 during the handover is called the target AN 42. When the handover is complete, the target AN becomes the new serving AN.

In the exemplary embodiments described herein, an AN 42 can serve five different roles in support of a packet data session. For convenience, the ANs are denominated herein as a connecting AN, anchor AN, primary AN, secondary AN, or serving AN depending on the role that the AN serves for a given mobile station. In some instances, an AN 42 can simultaneously serve multiple roles. The connecting AN is the AN 42 to which the mobile station 100 sends access requests when it wants to establish a connection for transmitting or receiving data. The anchor AN for a given mobile station 100 is the AN where the A10 connection for the mobile station 100 terminates. In general, the anchor AN will function as the serving AN for forward link packet communications, though this is not required. The primary AN for a given mobile station 100 is the AN 42 that stores the location and session information for the mobile station 100. The primary AN, according to one exemplary embodiment, allocates a UATI to the mobile station and performs session control functions as defined in TIA-1878 for the communication session (i.e. HRPD session).

Each AN 42 is configured with a pool of UATIs that it may allocate to mobile stations 100. In general, the primary AN and anchor AN will be different. The secondary AN for a given mobile station 100 stores the address of the anchor AN, which stores a redundant copy of the session information, in case the primary AN becomes unavailable. The serving AN is the AN 42 that transmits data to the mobile station 100 over the forward Traffic Channel (FTC). The serving AN may also be an anchor AN, primary AN, or secondary AN. If the serving AN 42 is not the anchor AN, the serving AN connects with the anchor AN over a side haul connection to provide a transmission path for user data between the serving AN and anchor AN.

At least one monitoring entity is designated for each AN 42. The monitoring entity is an entity in the network that monitors the availability of the AN 42 and notifies other ANs 42 when the monitored AN 42 becomes unavailable. There may be more than one monitoring entity for each AN 42. The monitoring entity for a given AN 42 could be another AN 42, the PDSN 22, or some other network entity.

Each AN 42 in a subnet is capable of determining the address of and accessing the primary AN for a given mobile station 100 that has been assigned a UATI by another AN 42 within the subnet. In the exemplary embodiment, the identity of the primary AN is determined based on the UATI. As noted above, each AN 42 is configured with its own pool of UATIs, which belong exclusively to that AN 42. The UATI is typically included in access channel messages sent by the mobile station 100 over the reverse access channel. Based on the UATI obtained from the mobile station 100, any AN 42 can determine the identity of the primary AN. For example, an AN 42 can store a mapping table that maps UATI values to the corresponding AN address. Once a mobile station 100 has been assigned a UATI, the mobile station 100 keeps the same UATI for the lifetime of an HRPD session, unless it moves into a different subnet 60. Methods of allocating UATIs to the mobile stations 100 are described in a related application entitled "METHOD OF ALLOCATING MOBILE STATION IDENTIFIERS AND USING MOBILE STATION IDENTIFIERS TO LOCATE SESSION INFORMATION", filed simultaneously herewith and identified by U.S. patent application Ser. No. 11/324,186. This application is incorporated herein by reference.

The primary AN serves as the principal location for storing session information for an HRPD session with a mobile station 100 and performs the session control function. The primary AN is capable of determining the address of and accessing the anchor AN. Both the primary AN and anchor AN store the current location of the mobile station 100 (i.e., the address of the AN that last received an access message from or last served the mobile station 100). Also, both the anchor AN and primary AN store the session state information records (SSIRs) for the mobile station 100. The session information stored in the primary AN is the same as the session information stored in the anchor AN, except during transient periods of time when the session is being updated or modified. As will be described in more detail below, it is possible to deliver data to the mobile station 100 as long as either the primary AN or anchor AN is available.

Figure 4A:
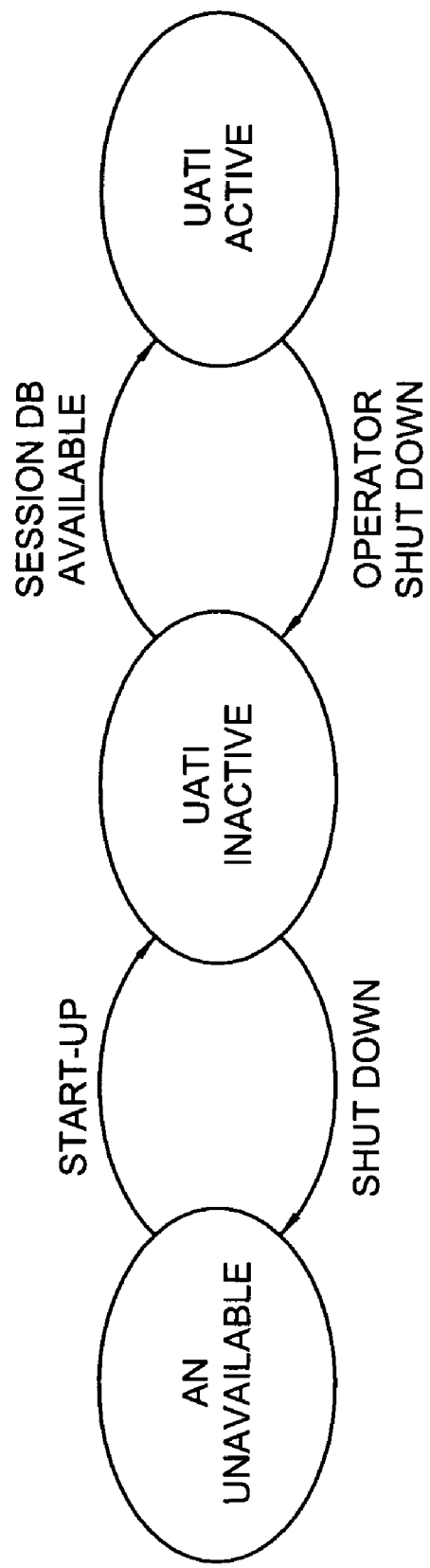
FIG. 4A is a state diagram illustrating operating states for an exemplary access node.

FIG. 4A is a state diagram illustrating operating states of an AN 42, which includes two operating states: the UATI Active state and the UATI inactive state. In the UATI Active state, the AN 42 can serve as a primary AN 42 and allocate UATIs from its allotment of UATIs. In the UATI Inactive state, the AN 42 cannot serve as a primary AN and cannot allocate UATIs. In this state, the AN 42 can still function as a serving AN or anchor AN. The UATI Inactive state is entered at start-up when the session database at the AN 42 is damaged or lost to prevent the AN 42 from allocating the same UATI to two or more mobile stations 100. The AN 42 should remain in this state until the session database is recovered, or until a predetermined "freeze" period expires. The freeze period may, for example, be the same as the session timer.

In the exemplary embodiment, each AN 42 is also capable of determining the address of and accessing the secondary AN of a given mobile station 100 if the primary AN becomes unavailable. When the primary AN is unavailable, the secondary AN provides the address of the anchor AN upon request from any other AN 42 in the subnet 60. The primary and secondary ANs are always distinct. For simplicity, mobile stations 100 assigned to the same primary AN may also be assigned to the same secondary AN. It is not required, however, that mobile stations 100 assigned to the same primary AN shall also have the same secondary AN. In some embodiments, the secondary AN could also store the mobile station location and session information and thus serve as a backup to the primary AN. In this case, the secondary AN could provide session information to another AN 42 upon request. Storing the mobile station location and session information in the secondary AN provides a greater degree of robustness and allows the network to deliver data to a mobile station as long as either the primary AN, secondary AN, or anchor AN is available.

FIGS. 5-16 illustrate exemplary procedures implemented by the network and give further details regarding network operation.

Figure 5:
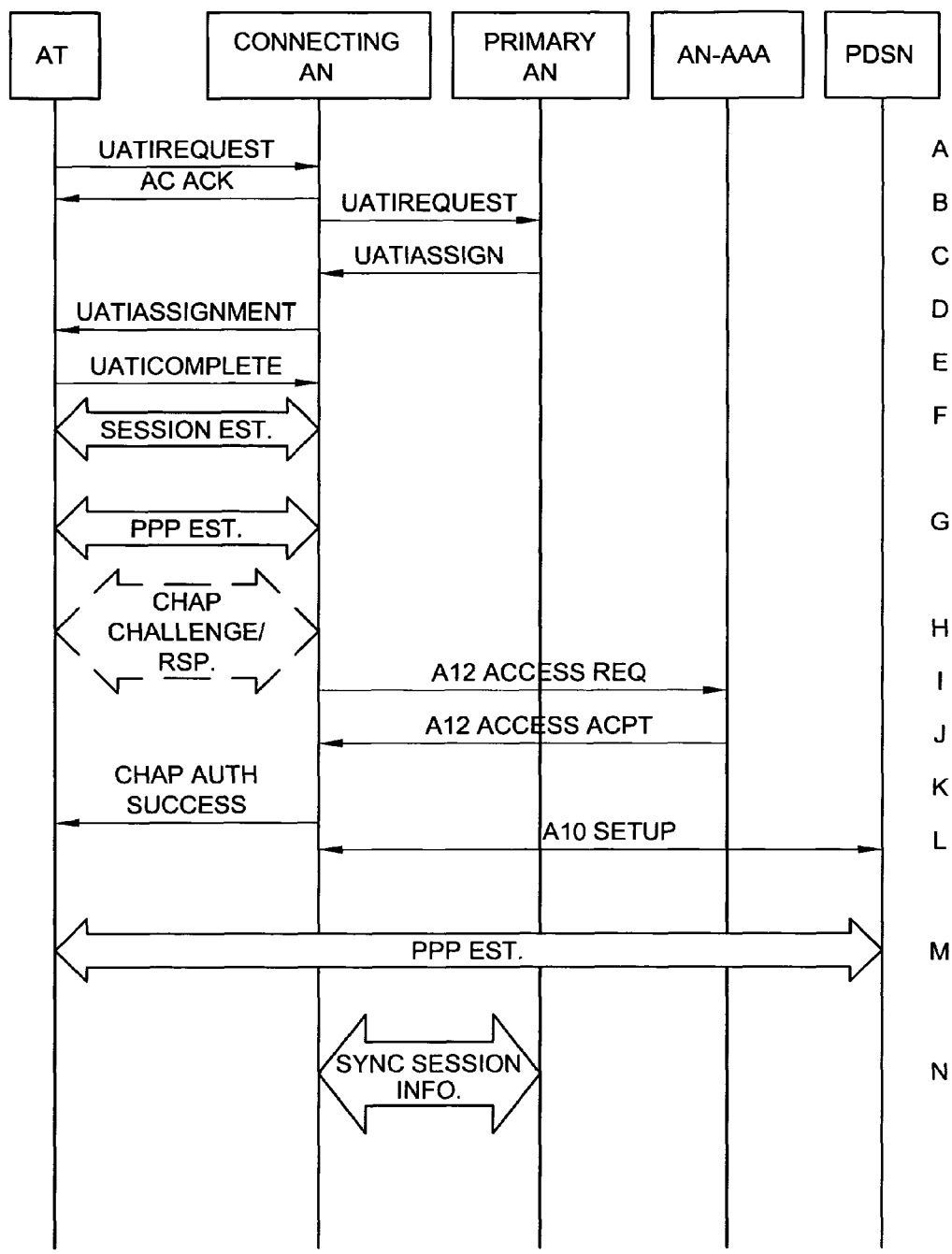
FIG. 5 illustrates an exemplary session establishment procedure for establishing a communication session with a mobile station.

FIG. 5 illustrates an exemplary procedure for establishing a PPP session with the PDSN 22. The mobile station 100 sends a UATI Request message to the connecting AN to request assignment of a UATI (step a). The UATI Request message is sent over the reverse access channel. The connecting AN selects another AN 42 within the same subnet 60 to serve as the primary AN for the mobile station 100 and sends a UATI Request message to the selected primary AN (step b). Each AN 42 in the subnet 60 maintains a list of the available ANs 42, which may include the state (e.g., UATI Active or UATI Inactive). The primary AN is selected from the ANs 42 in the availability list that are in the UATI Active state. The primary AN selects a previously unused UATI from its UATI pool, and sends a UATI Assignment message to the connecting AN (step c). The primary AN starts a timer and waits for the connecting AN to initiate a synchronization procedure. The connecting AN sends a UATI Assignment message to the mobile station 100 (step d), and the mobile station 100 sends a UATI Complete message to the connecting AN (step e). Once the mobile station 100 is assigned a UATI, the mobile station 100 and connecting AN open an HRPD session (step f). To establish the HRPD session, the mobile station 100 opens a temporary connection with the connecting AN, negotiates the session parameters, and closes the temporary connection. The session parameters are stored temporarily at the connecting AN.

After the HRPD session is established, the connecting AN may authenticate the mobile station 100. For instance, in HRPD, to perform the authentication procedure, the mobile station 100 and connecting AN open a PPP connection (step g). The connecting AN sends a challenge to the mobile station 100, and the mobile station 100 sends a challenge response to the connecting AN (step h). The connecting AN sends the challenge and the mobile station's challenge response to the AAA in a RADIUS Access Request message that includes the mobile station's IMSI (step i). The AAA verifies the identity of the mobile station 100 based on the challenge response and, if verified, sends a RADIUS Access Accept message to the connecting AN (step j). The connecting AN, in turn, sends an Authentication Success message to the mobile station 100 (step k). The authentication procedure is then complete and the PPP session can be released.

Following authentication, the connecting AN establishes an A10 connection with the PDSN 22 (step 1). The connecting AN sends an A11 Registration Request message to the PDSN 22 to establish the packet data session. The Registration Request message includes the mobile station's IMSI, which was retrieved during authentication. The PDSN 22 replies to the connecting AN by sending an A11 Registration Reply message. At this point, the connecting AN has become the anchor AN for the packet data session. The mobile station 100 and PDSN 22 set up a PPP session (step m), and the connecting AN, which is now the anchor AN, initiates a synchronization procedure with the primary AN (n). During the resynchronization procedure, the primary AN stops the timer started in step c.

The selection of the primary AN can be made randomly, or in a predetermined manner to distribute the session management load among all of the ANs 42 in a given subnet 60 to prevent overloading of an access node. For example, an access node located near an airport may deplete its available UATIs if required to allocate all UATIs from its own pool, even though other ANs 42 may have plenty available UATIs. Thus, the present invention provides a form of load balancing that avoids the problem of UATI depletion at an AN near an airport or other areas that tend to accumulate stale HRPD sessions.

Figure 6:
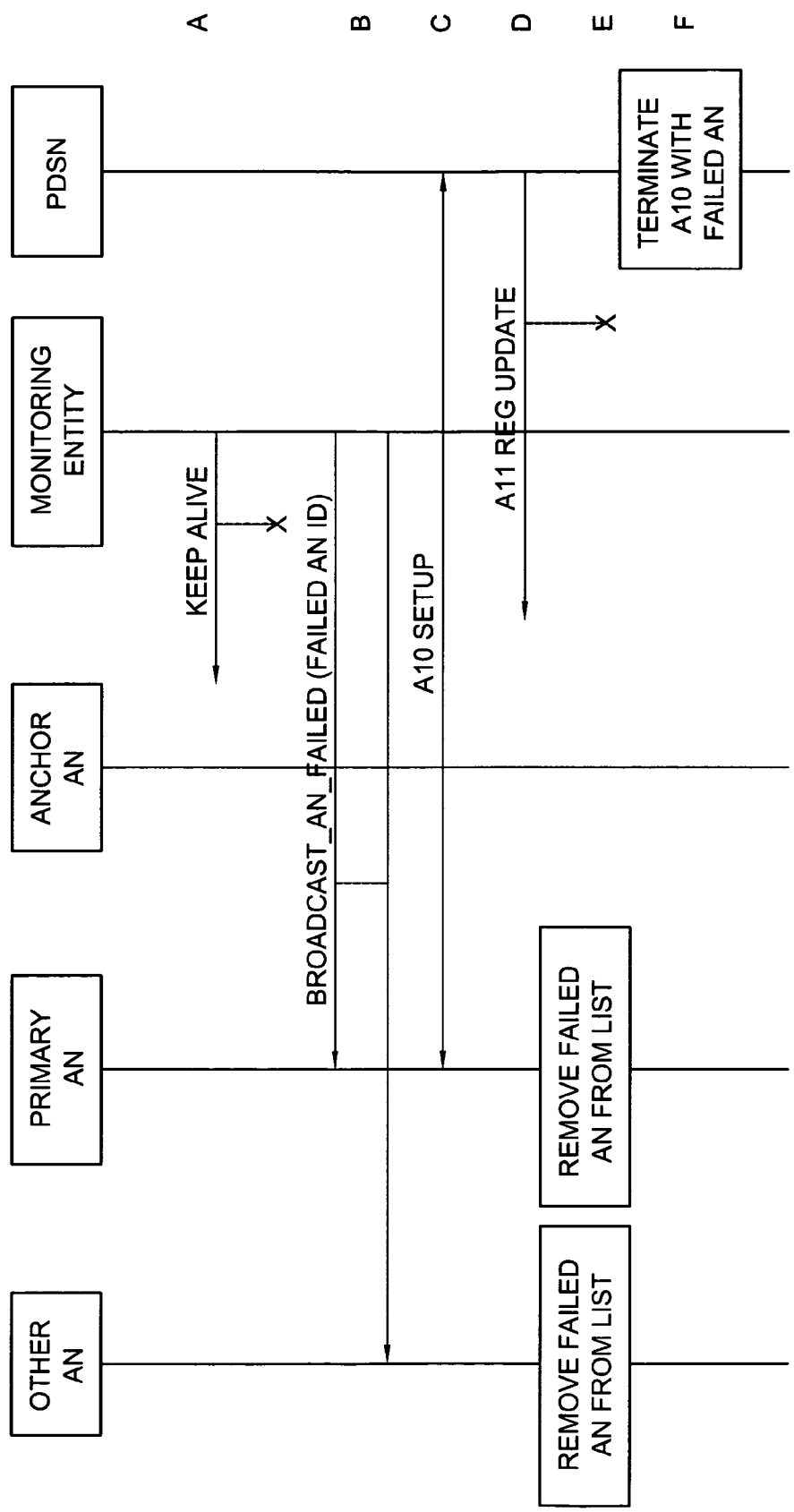
FIG. 6 illustrates an exemplary recovery procedure when the anchor AN becomes unavailable, in which the A10 connections for a communication session are moved to the primary node.

FIG. 6 illustrates an exemplary recovery procedure implemented by the network when an anchor AN becomes unavailable. A monitoring entity detects that an AN 42 has become unavailable (step a). The failed AN serves as the anchor AN for at least one, and possibly many, mobile stations 100. The monitoring entity broadcasts an Event Notification message to all ANs 42 in the subnet to inform the ANs 42 in the subnet that an AN 42 has become unavailable (step b). Upon receipt of the Event Notification message, the primary ANs for mobile stations 100 having A10 connections anchored by the failed AN 42 initiate an A10 connection setup with the PDSN 22 (step c). After the new A10 connection is established, the PDSN 22 sends an A11 Registration Update message to the failed AN 42 to terminate the A10 connection (step d). According to standard procedures, if the failed AN 42 does not reply, the PDSN 22 clears the A10 connection at the PDSN side.

Figure 7:
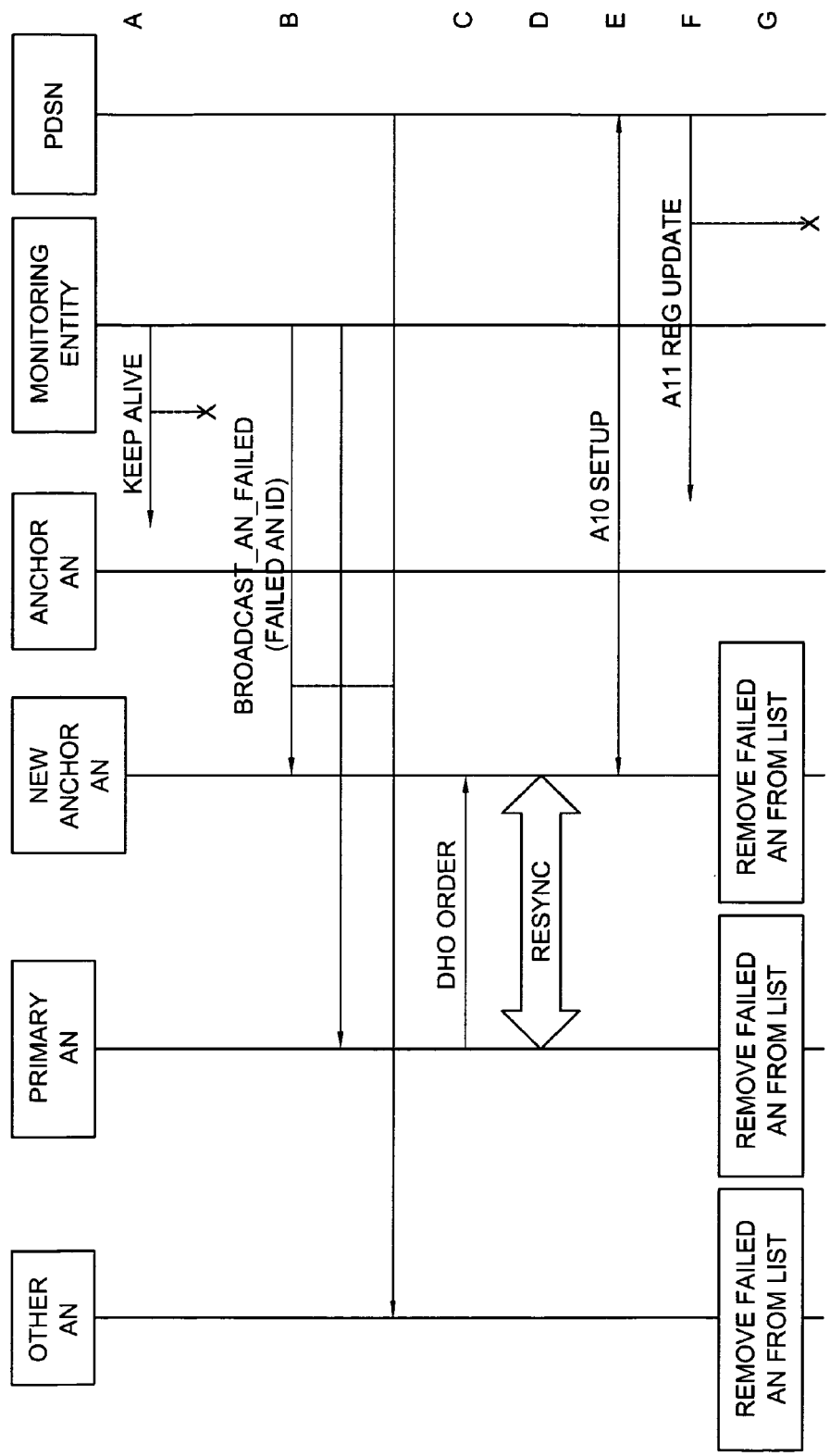
FIG. 7 illustrates another exemplary recovery procedure when the anchor AN becomes unavailable, in which the session information and A10 connections.

When the primary AN establishes an A10 connection with the PDSN 22, it assumes the role of an anchor AN. If an AN 42 serving as both a primary AN and anchor AN fails, the mobile stations 100 supported by the AN 42 would no longer be reachable. The number of mobile stations 100 affected by such a double failure should be limited. If the double failure scenario is a concern, the primary AN could, alternatively, select an AN in the subnet 60 to become the new anchor AN as shown in FIG. 7. After the failed AN is detected (step a) and the monitoring entity notifies the other ANs 42 in the subnet (step b). Each primary AN sends a Dormant Handoff Request message to another selected AN 42 within the subnet to initiate a dormant handoff (step c). The new anchor AN initiates procedures to retrieve the mobile station location and session information from the primary AN (step d), and sets up a new A10 connection with the PDSN 22 (step e). The PDSN 22 sends an A11 registration update message to the failed AN to release the A10 connection (step f). When no acknowledgement is received, the PDSN 22 removes the A10 connection on its side.

Figure 8:
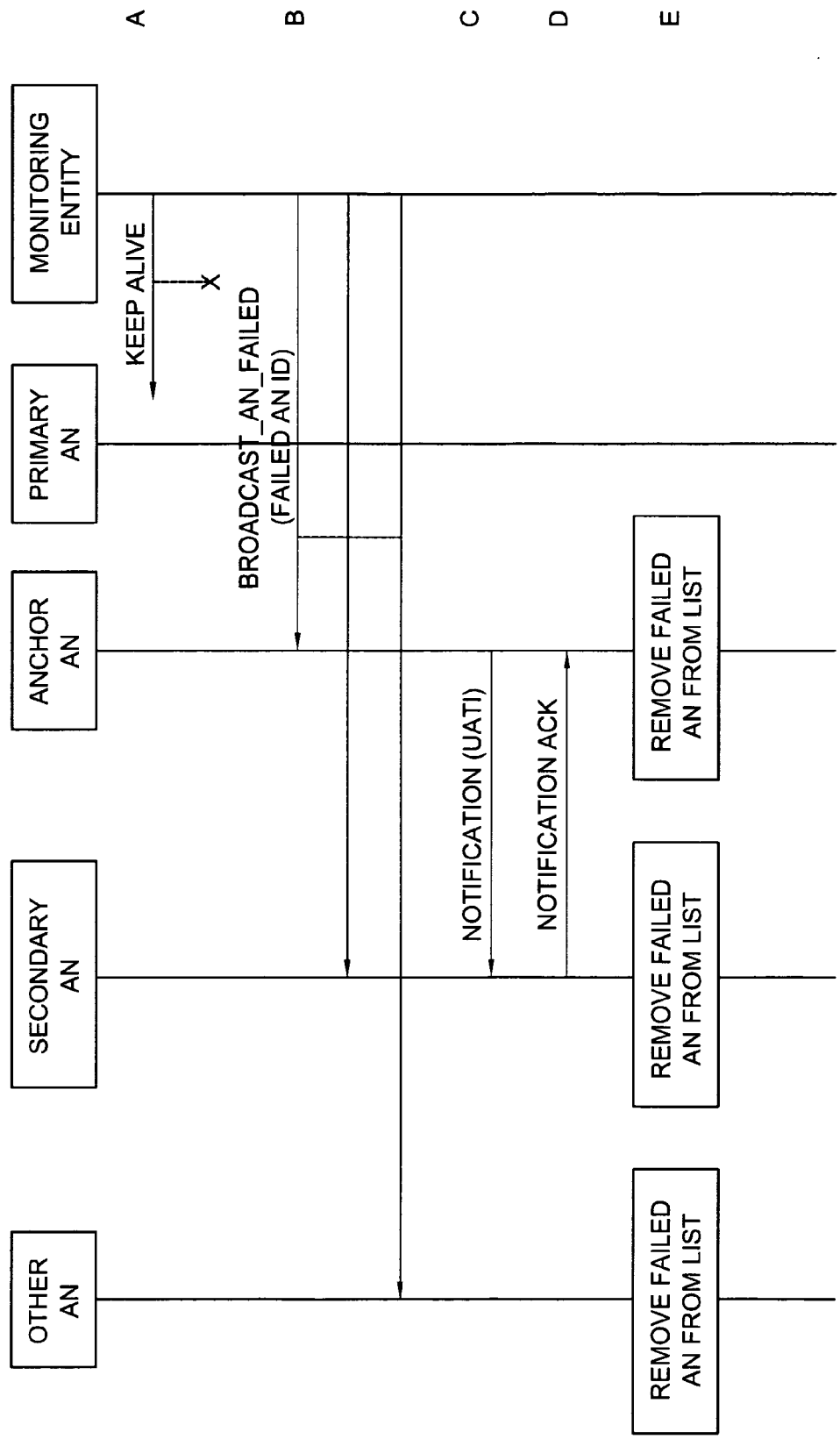
FIG. 8 illustrates an exemplary recovery procedure when the primary node becomes unavailable, which involves promoting secondary node to the primary node.

FIG. 8 illustrates another exemplary recovery procedure executed when a primary AN becomes unavailable. The monitoring entity detects that an AN has become unavailable (step a) and multicasts an Event Notification message to all ANs 42 in the subnet 60 to notify them that the failed primary AN has become unavailable (step b). Upon receipt of the Event Notification message, each anchor AN for a mobile station 100 served by the failed primary AN sends a Notification message to the secondary AN to indicate that it has the session information for the mobile station 100 (step c), and the secondary AN sends a Notification ACK message to acknowledge the notification message (step d). The Notification message may include the address of the anchor AN if not already known to the secondary AN. Thereafter, when a connecting AN 42 receives a connection request from a mobile station 100, the connecting AN can request the address of the anchor AN from the secondary AN and retrieve the session information from the anchor AN.

In the procedure shown in FIG. 8, the mobile station 100 will be unavailable if the anchor AN also fails. If this double failure scenario is a concern, the anchor AN could, at step c, send the mobile station location and session information to the secondary AN. In this case, the secondary AN could replace the primary AN, at least until a new primary AN is established.

Figure 9:
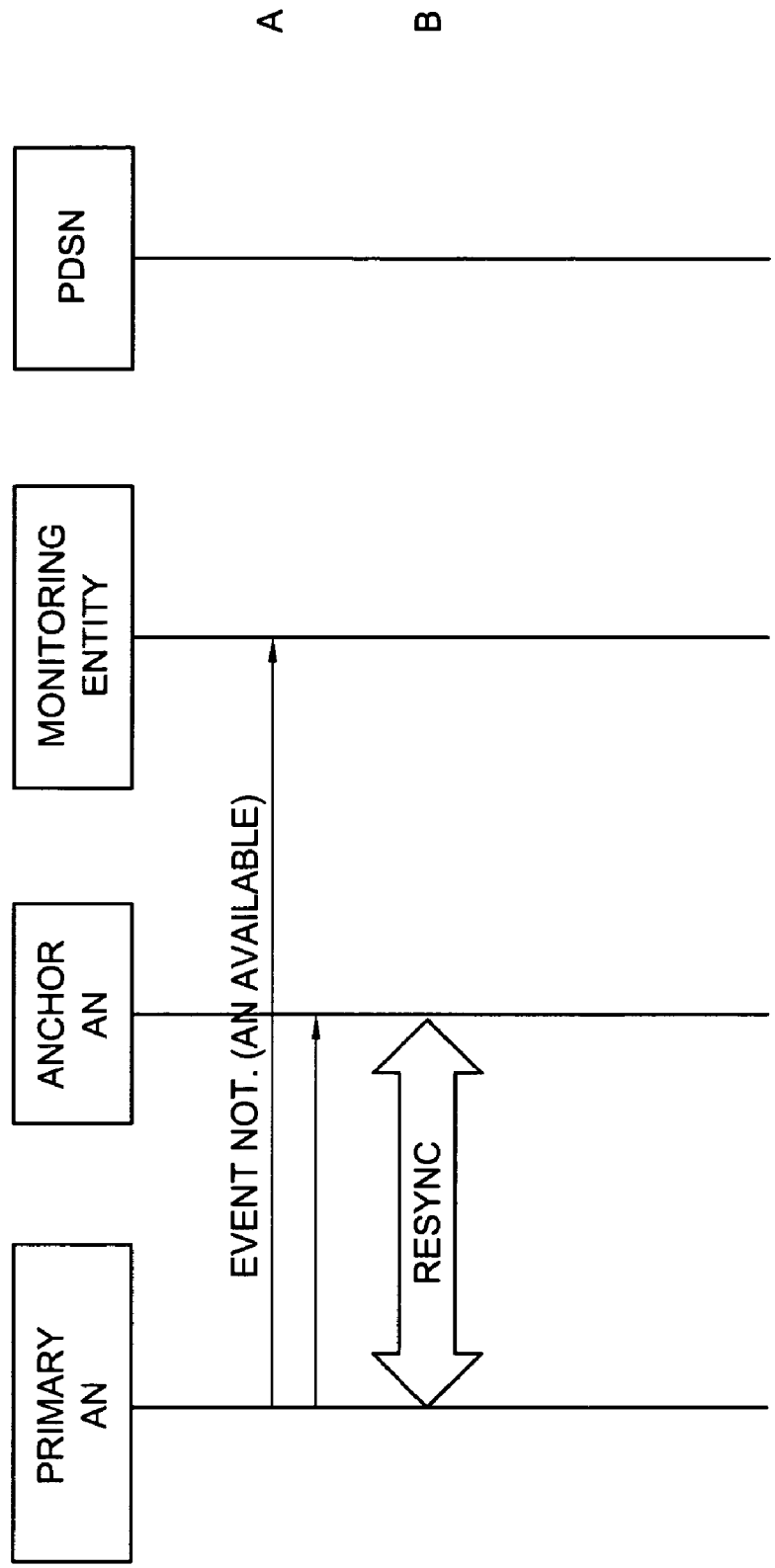
FIG. 9 illustrates an exemplary recovery procedure when the primary node becomes available including synchronizing session information stored at an anchor node and primary node.

FIG. 9 illustrates a synchronization procedure that may be executed when a previously unavailable primary AN becomes available again. The previously unavailable primary AN broadcasts an Event Notification message to all ANs 42 in the subnet 60 when it becomes available (step a). Upon receipt of the Event Notification message, the anchor AN initiates a synchronization procedure with the primary AN to update the mobile station location and session information. During the synchronization procedure, the mobile station location and session information is copied from primary AN to the anchor AN. If the session information was copied to the secondary AN as described above, then the primary AN may perform the synchronization procedure with the secondary AN rather than the anchor AN. If the primary AN cannot determine which UATIs were assigned prior to it becoming unavailable, the primary AN should not assign any new UATIs for a period at least as long as the maximum session lifetime to ensure that the same UATI is not assigned to two mobile stations 100. In this case, the primary AN should enter the UATI Inactive state for a predetermined "freeze" period.

Figure 10:
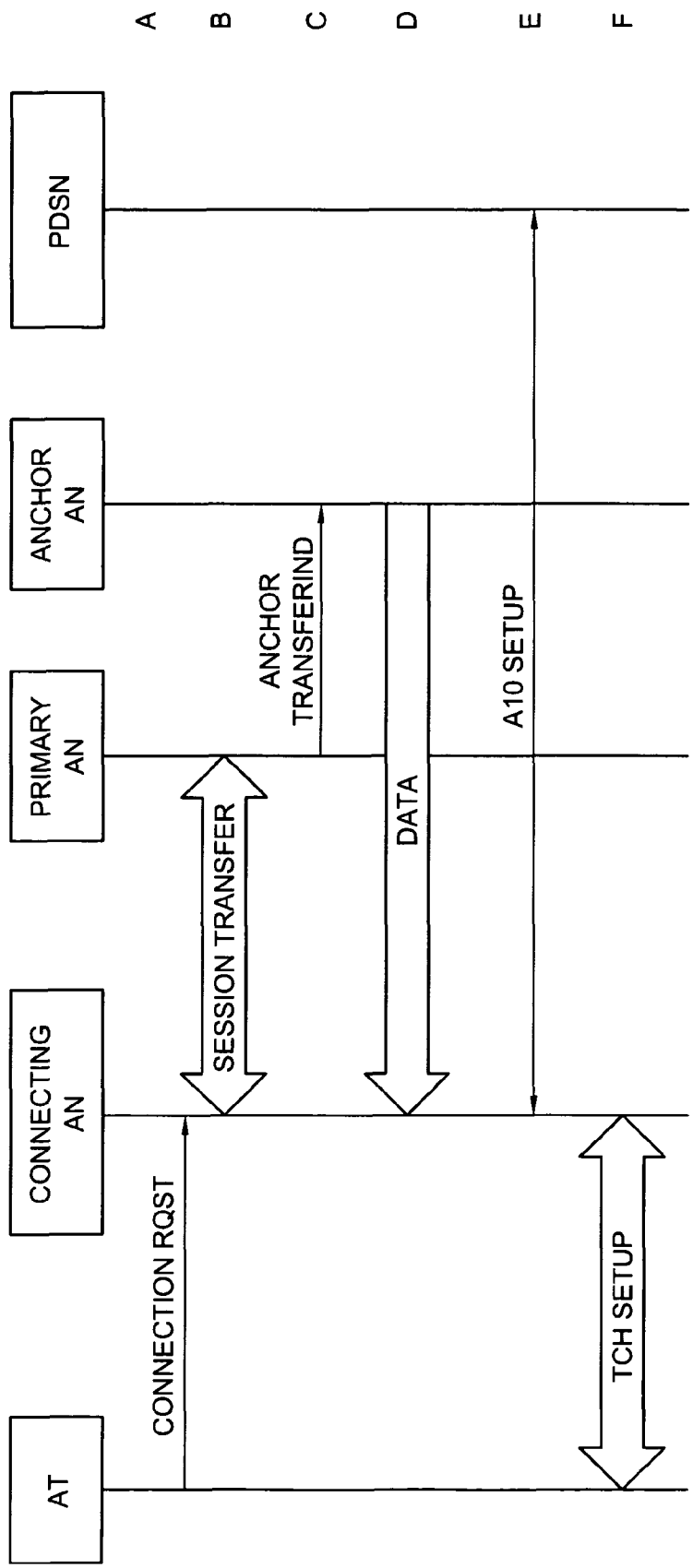
FIG. 10 illustrates an exemplary mobile initiated reactivation procedure for reactivating a communication session with a dormant mobile station when the primary node is available.

FIG. 10 illustrates a mobile station initiated reactivation procedure to reactivate a dormant packet data session. When the packet data session is dormant, the mobile station 100 releases its connection with the serving AN so that the radio resources can be used to support other mobile stations 100. When the mobile station 100 needs to send data, the mobile station 100 sends a Connection Request message to a connecting AN over a reverse access channel (step a). The connection request includes the UATI allocated to the mobile station 100 when it established the packet data session. The connecting AN retrieves the mobile station's session information from the primary AN, and the mobile station's location is updated in the primary AN (step b). The session control function, however, is not moved and the primary AN continues to serve as the session controller for the HRPD session. The primary AN sends an Anchor Transfer Indication message to the anchor AN to request the anchor AN to send any buffered data to the connecting AN (step c). The anchor AN starts transmitting buffered data to the connecting AN (step d). The connecting AN initiates setup of an A10 connection with the PDSN 22, if not already available, and the connecting AN becomes the new anchor AN (step e). The PDSN 22 initiates release of the A10 connection to the previous anchor AN. A traffic channel is then set up between the mobile station 100 and the connecting AN (step f). This step can be performed any time after the session information is transferred to the connecting AN in step d. After the traffic channel is set up, the connecting AN transmits data received from the previous anchor AN before it transmits data received from the PDSN 22. The connecting AN discards any data that it receives from the anchor AN after it has begun transmitting data received from the PDSN 22.

Figure 11:
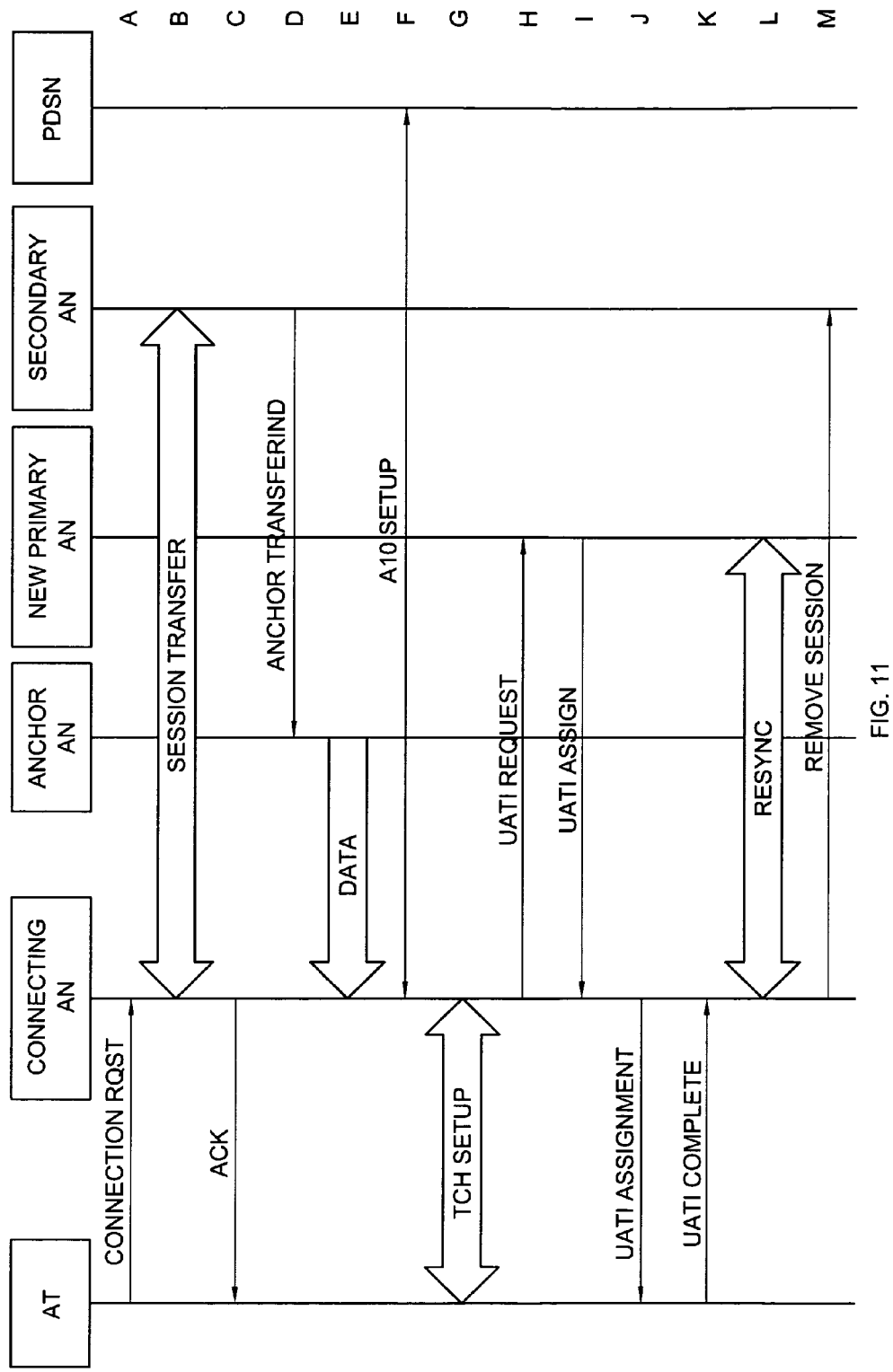
FIG. 11 illustrates a mobile initiated exemplary reactivation procedure for reactivating a communication session with a dormant mobile station when the primary node is unavailable.

FIG. 11 illustrates a mobile station initiated reactivation procedure when the primary AN is unavailable. The mobile station 100 sends a Connection Request message to the connecting AN (step a). The connecting AN retrieves the session information for the mobile station 100 from either the anchor AN or secondary AN, depending upon the implementation (step b). If the session information is copied to the secondary AN when the primary AN becomes unavailable, the session information can be retrieved from the secondary AN as shown in FIG. 11. If the session information is not copied to the secondary AN, the connecting AN may request the anchor AN address from the secondary AN and thereafter retrieve the session information from the anchor AN. After retrieving the session information, the connecting AN sends an acknowledgement (ACK) to the mobile station 100 to acknowledge the Connection Request (step c). When the session information is retrieved, the mobile station location is updated by either the anchor AN or secondary AN. In the exemplary procedure shown in FIG. 11, the secondary AN sends an anchor transfer message to the anchor AN to request the anchor AN to send any buffered data to the connecting AN (step d). This step is not performed if the session information is retrieved directly from the anchor AN. The anchor AN starts transmitting buffered data to the connecting AN (step e), and the connecting AN initiates the setup of an A10 connection with the PDSN 22 if not already available (step f). The connecting AN becomes the new anchor AN and the PDSN 22 initiates release of the A10 connection with the old anchor AN. While the A10 connection is set up with the connecting AN, the mobile station 100 and connecting AN set up a traffic channel (step g). This step can be performed any time after the connecting AN receives the session information. The connecting AN selects another AN in the same subnet 60 to become the new primary AN for the mobile station 100 and sends a UATI Request message to the selected AN to request assignment of a UATI from the selected primary AN (step h). The new primary AN sends the UATI to the connecting AN in a UATI Assignment message (step i). The connecting AN, in turn, sends a UATI Assignment message to the mobile station 100 (step j), and the mobile station 100 sends a UATI Complete message to the connecting AN (step k). Upon receipt of the UATI Complete message, the connecting AN (which is now the anchor AN) synchronizes the mobile station location and session information with the new primary AN (step l). The connecting AN sends a Remove Session message to the old secondary AN to remove the session from the secondary AN (step m).

Figure 12:
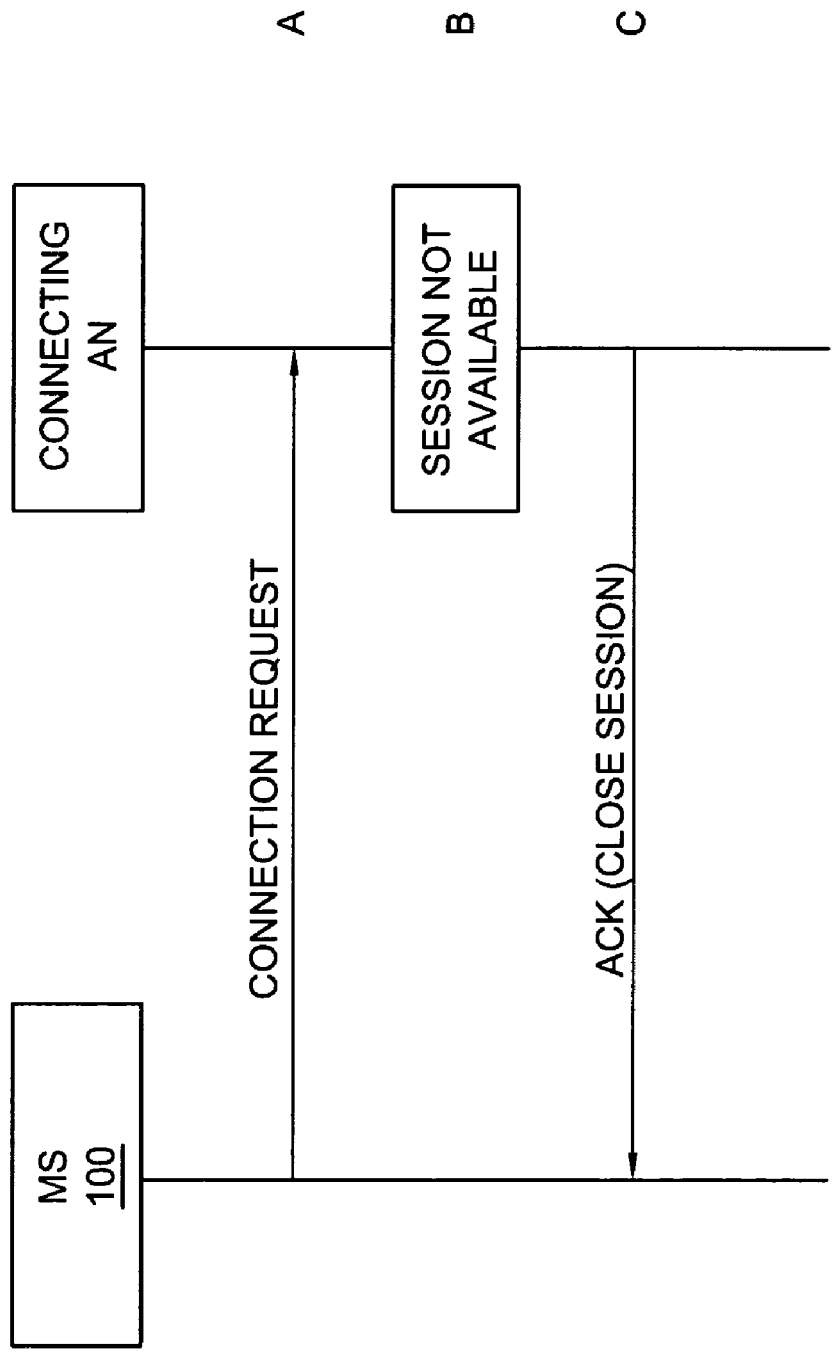
FIG. 12 illustrates a mobile initiated reactivation procedure where the session information is not available.

FIG. 12 illustrates a recovery procedure where the connecting AN is unable, for some reason, to recover the session information. For example, in some embodiments, the service provider may elect not to implement the secondary AN. In embodiments lacking a secondary AN, only a portion of the session information needs to be replicated in the anchor AN. One consequence of this embodiment is that the connecting AN will not be able to retrieve the session information when the primary AN is unavailable. Therefore, upon receipt of a Connection Request from the mobile station 100 (step a), the connecting AN determines whether the session information is available (step b). If not, the connecting AN sends an acknowledgement (ACK) to the mobile station 100 along with a Close Session Request (step c). The mobile station 100 may thereafter initiate the procedure shown in FIG. 5 to establish a new session.

The reactivation procedure for the case where the anchor AN is not available is the same as shown in FIG. 10. It should be noted that the anchor AN is not normally involved in the reactivation of a dormant packet data session when the mobile station 100 has changed cells. The reactivation has the beneficial "self-healing" effect of establishing a new anchor AN.

Figure 13:
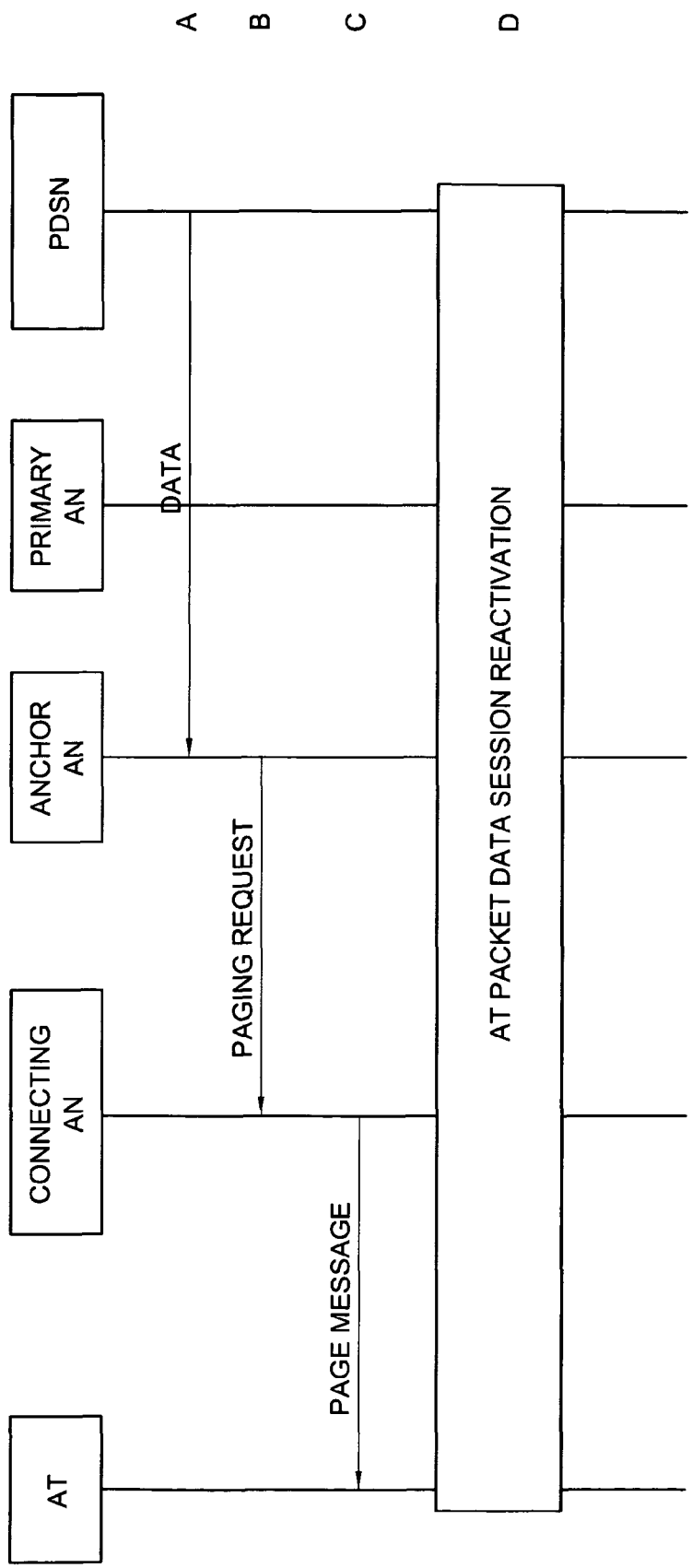
FIG. 13 illustrates an exemplary network initiated reactivation procedure for reactivating a communication session with a dormant mobile station when the primary node is available.

FIG. 13 illustrates a network-initiated reactivation procedure. This procedure is executed when the PDSN 22 receives packet data for a dormant mobile station 100. The PDSN 22 forwards the packet data to the anchor AN (step a). The anchor AN, which keeps the location and session information for the mobile station 100, sends a Paging Request message to the connecting AN (step b). The connecting AN sends a Page message to the mobile station 100 over the air interface (step c). Upon receipt of the Page message, the mobile station 100 performs the reactivation procedure shown in FIG. 10 (step d).

Figure 14:
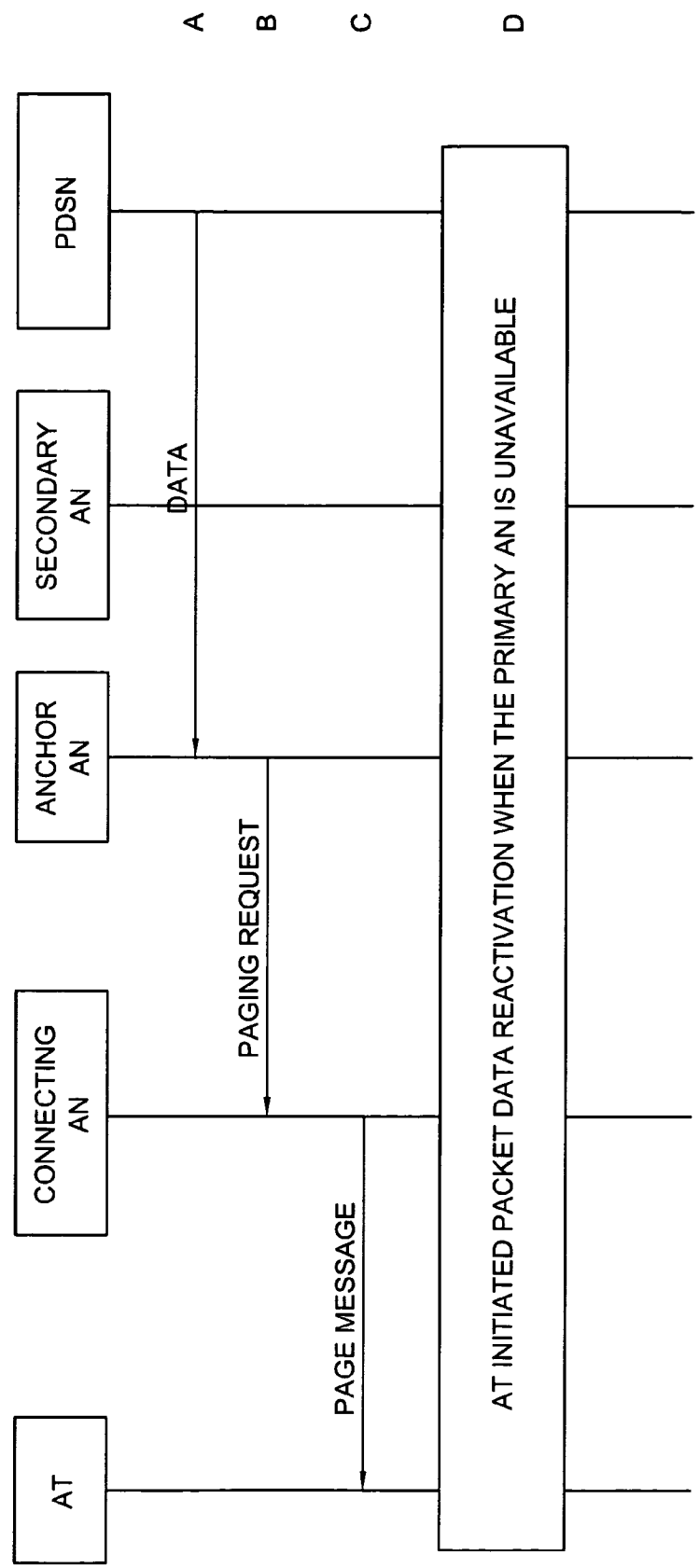
FIG. 14 illustrates an exemplary network initiated reactivation procedure for reactivating a communication session with a dormant mobile station when the primary node is unavailable.

FIG. 14 illustrates a network-initiated reactivation procedure when the primary AN is unavailable. This procedure is executed when the PDSN 22 receives packet data for a dormant mobile station 100 and the primary AN is not available. The PDSN 22 forwards the packet data to the anchor AN (step a). The anchor AN sends a Paging Request message to the connecting AN (step b). The connecting AN sends a Page message to the mobile station 100 (step c). Upon receipt of the Page message, the mobile station 100 initiates a reactivation procedure as shown in FIG. 11 (step d). In this case the connecting AN will already know the address of the anchor AN (because it received the Paging Request from the anchor AN) and can therefore retrieve the session information from the anchor AN without involving the secondary AN.

Those skilled in the art will appreciate that when the anchor AN is unavailable, the network cannot deliver data to the mobile station 100. This scenario should be rare since the primary AN will become an anchor AN soon after a monitoring entity has detected that the anchor AN is unavailable.

Figure 15:
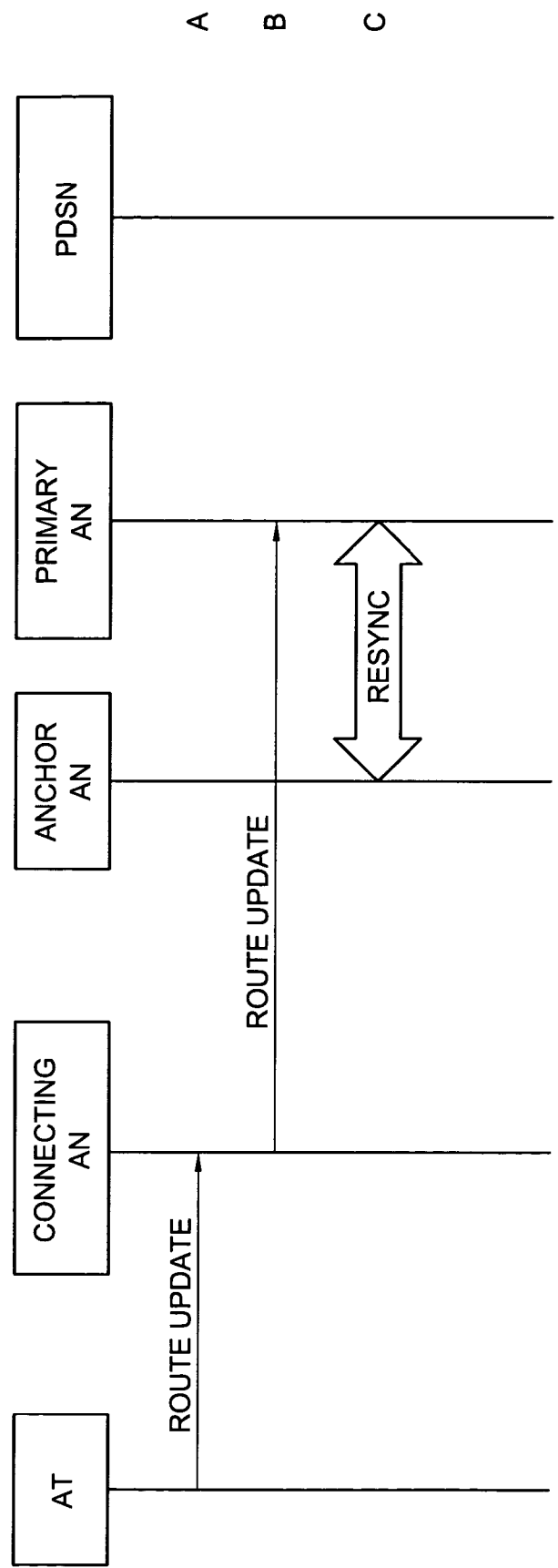
FIG. 15 illustrates a route update procedure for updating the mobile station location when the primary node is available.

FIG. 15 illustrates an update procedure for updating the mobile station location. This procedure is executed when the mobile station 100 has moved more than a predetermined distance since the last registration The procedure may be triggered, for example, when the mobile station 100 detects that it has moved into a new packet zone. This procedure may also be triggered depending on the distance of the mobile station 100 from the anchor AN. Regardless of the triggering event, the mobile station 100 sends a Route Update message to the connecting AN over a reverse access channel (step a). The connecting AN sends a Route Update message to the primary AN (step b). The primary AN initiates a synchronization procedure with the anchor AN to update the location and session information at the anchor AN (step c).

Figure 16:
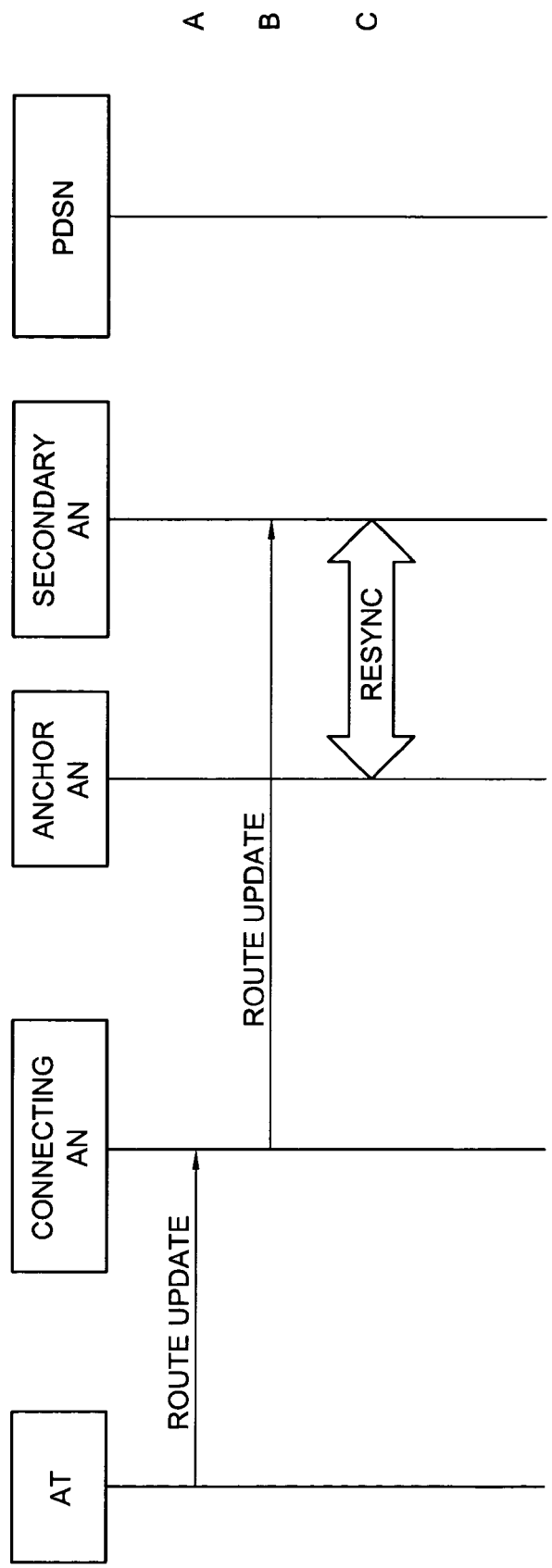
FIG. 16 illustrates a location update procedure for updating the mobile station location when the primary node is unavailable.

FIG. 16 illustrates an update procedure performed when the primary AN is unavailable. In this case, the mobile station 100 sends a Route Update message to the connecting AN when the update is triggered (step a). The connecting AN sends a Route Update message to the secondary AN (step b), and the secondary AN initiates a synchronization procedure to update the mobile station location and session information stored at the anchor AN (step c). After the synchronization procedure, a new UATI and a new primary AN may be assigned to the mobile station 100. In this case, the connecting AN selects a new primary AN and sends a UATI Request message to the selected primary AN (step d). The new primary AN sends a UATI Assignment message to the connecting AN (step e). The connecting AN sends a UATI Assignment message to the mobile station 100 (step f), and the mobile station 100 sends a UATI Complete message to the connecting AN (step g). The anchor AN then initiates a synchronization procedure (step h) to copy the session information and mobile station location to the new primary AN. The anchor AN then sends a Remove Session message to the old secondary AN.

Figure 17:
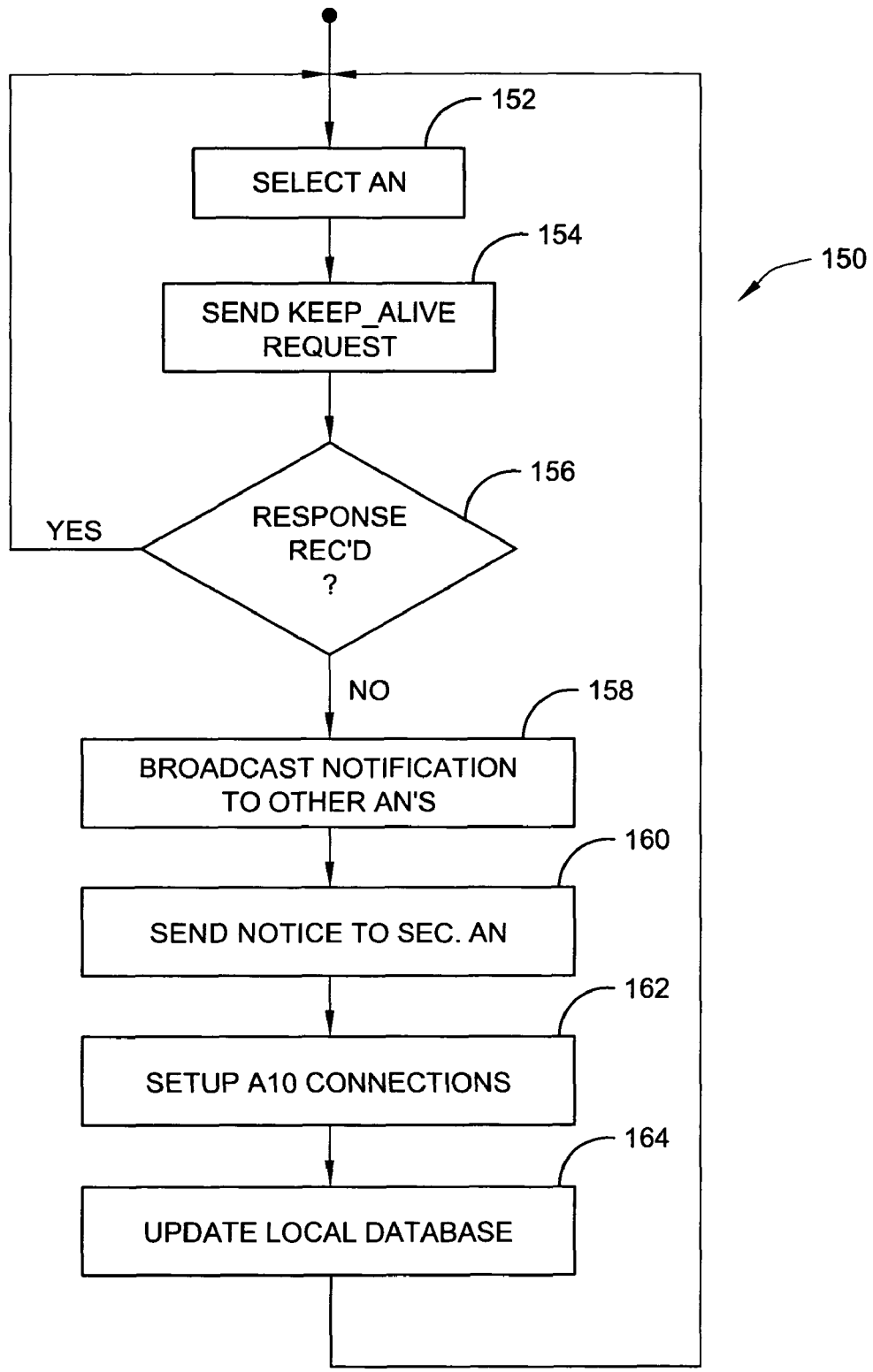
FIG. 17 illustrates an exemplary monitoring procedure implemented by an access node.

FIG. 17 illustrates a monitoring procedure that may be implemented by an AN 42 in embodiments where the ANs 42 function as monitoring entities. This procedure is initiated after start up of the AN 42 and is repeated periodically until the AN 42 is shut down. The AN 42 selects another AN (step 152), either randomly or according to some other selection algorithm, and sends the selected AN a Keep-Alive Request (step 154). The Keep-Alive Request 154 may be repeated a predetermined of times, which can be configured by the service provider. If a response to the Keep-Alive Request is received (block 156), the process repeats continuously. If no response is received (block 156), the AN 42 sends a broadcast message (e.g., Broadcast_AN_Failed) to all other ANs 42 (block 158) that serves as an event notification to announce the event to the other ANs 42 in the subnet 60. The broadcast message includes an AN identifier that identifies the failed AN. If the monitoring AN 42 is serving as an anchor AN for sessions where the failed AN is the primary AN, the monitoring AN 42 sends notification messages to the corresponding secondary ANs as previously described and shown in FIG. 8 (block 160). Similarly, if the monitoring AN is the primary AN for sessions anchored by the failed AN 42, the monitoring AN 42 may set up a new A10 connection with the PDSN for those sessions as previously described and shown in FIG. 6 (block 162). Alternatively, the monitoring AN 42 could send a handoff directive (DHO) to another AN 42 as described and shown in FIG. 7. In all cases, the monitoring AN removes the failed AN 42 from its local database, or otherwise updates the local database to reflect the unavailability of the failed AN (block 164).

Figure 18:
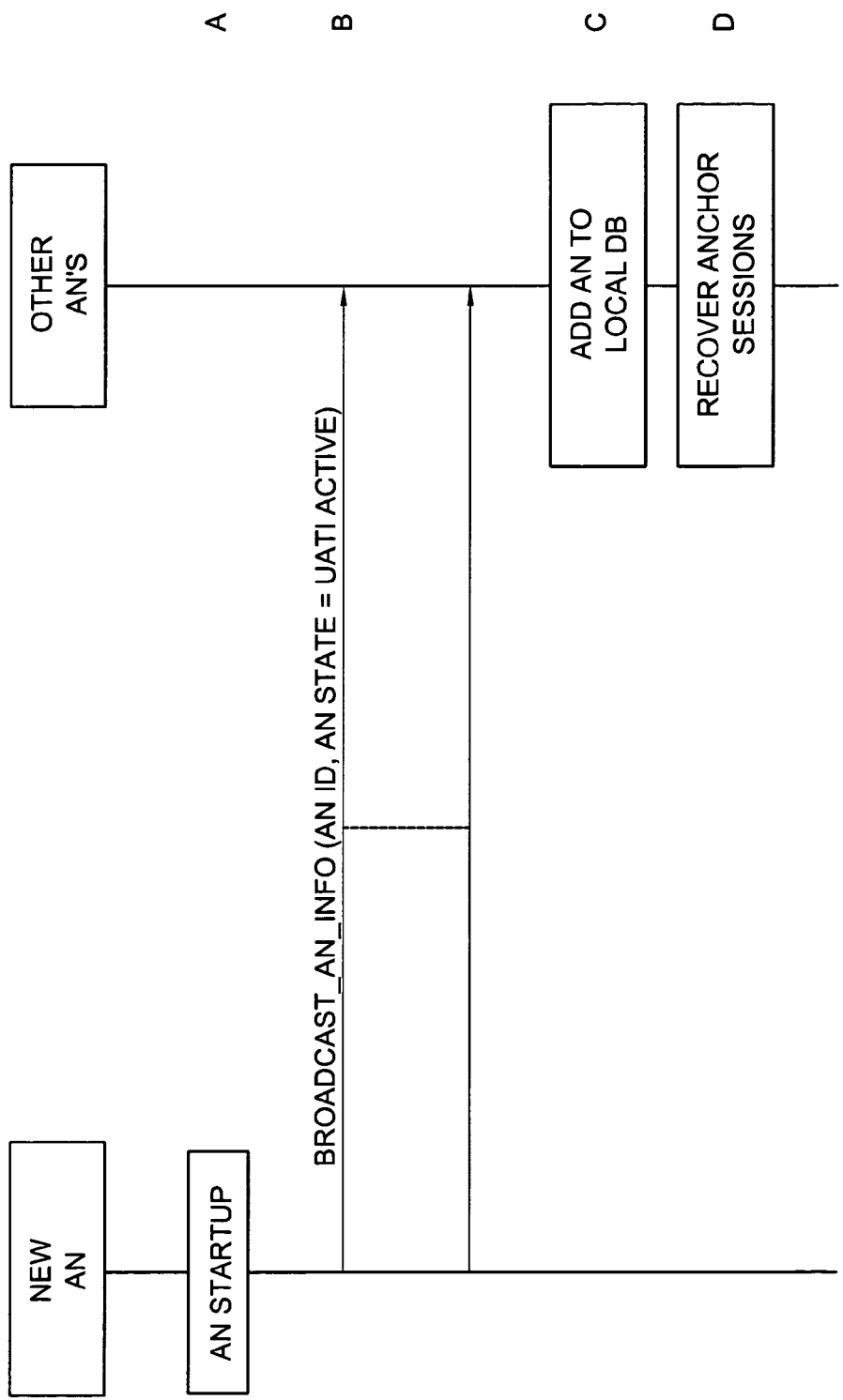
FIG. 18 illustrates an exemplary start-up procedure where the local database is available.

FIG. 18 illustrates a startup procedure for starting up an AN 42. After startup (step a) the AN 42 sends a broadcast message (e.g., Broadcast_AN_Info) to all other ANs 42 in the subnet 60 to announce its availability. The broadcast message includes the AN identifier for the newly started AN 42 and gives the state of the AN. In this example, it is assumed that the session database is available so the AN 42 starts up in the UATI Active state. The broadcast message may be repeated a predetermined number of times. Upon receipt of the broadcast message from the newly started AN 42, the other ANs 42 in the subnet 60 add the new AN to their local database, if not already known, and record the state of the AN 42 (step b). It should be noted that all ANs 42 in the UATI Active state are available to be selected as a primary AN. All ANs 42 in the UATI Active and UATI Inactive states are available for selection by the monitoring algorithm shown in FIG. 17. Normally, all A10 connections that were anchored at the anchor node when it was shut down would be moved by the respective primary nodes upon receipt of the broadcast message signaling the shutdown, as shown in FIG. 17 block 162 and FIG. 20, step d. However, if the multicast message signaling the shutdown was not received, the primary nodes will establish the A10 connections upon receipt of a broadcast message signaling that the node has become available again. In other words, if the AN is being restarted after being shutdown, the ANs receiving the broadcast message from the newly started AN will also establish new A10 connections for any active sessions for which the newly started AN served as the anchor AN (step d) prior to being shut down. The new A10 connections are established by the ANs 42 serving as the primary ANs for the corresponding sessions previously anchored by the newly started AN 42.

Figure 19:
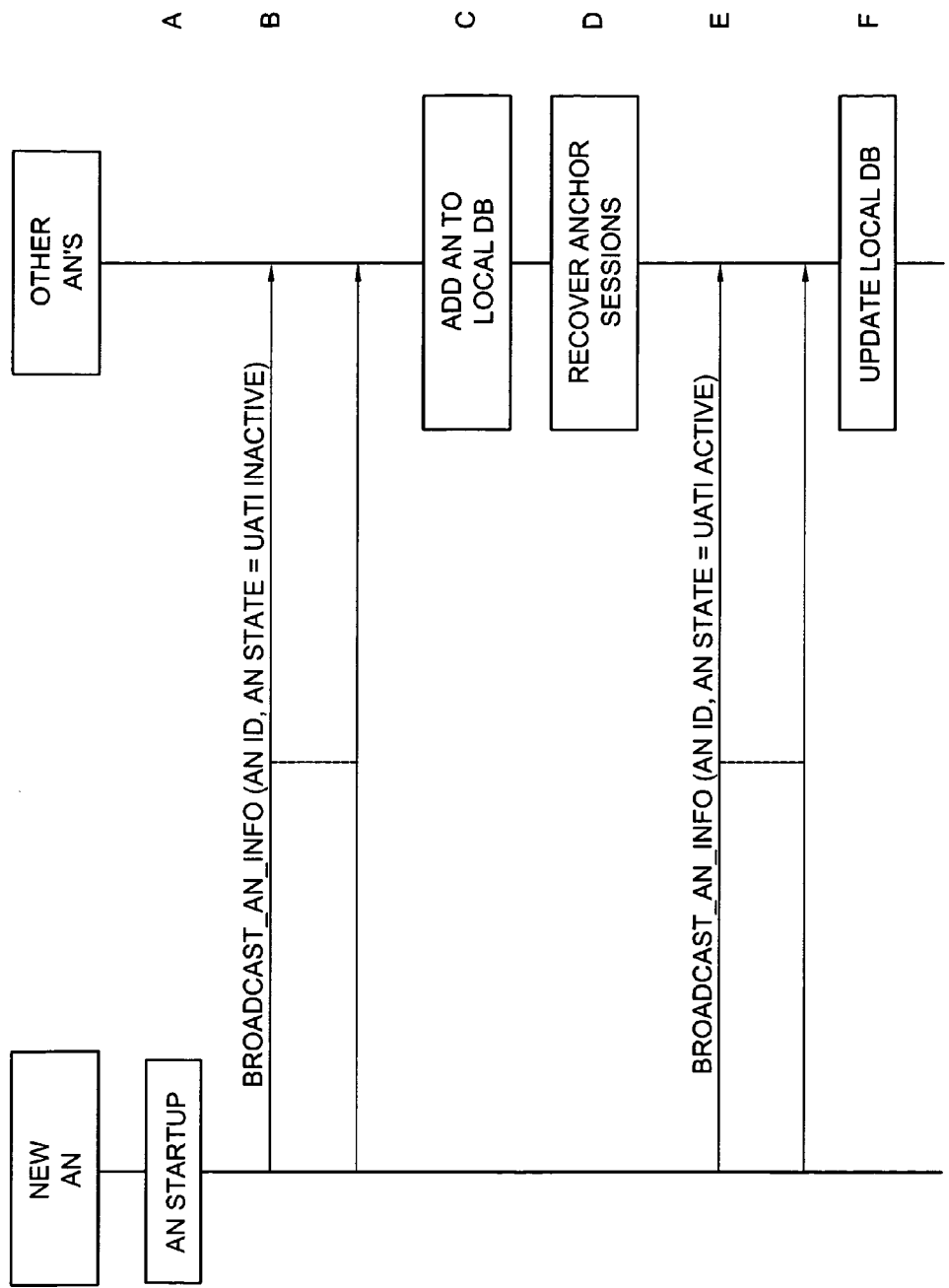
FIG. 19 illustrates an exemplary start-up procedure where the local database is unavailable.

FIG. 19 illustrates a startup procedure for an AN 42 where the session database of the AN 42 is inaccessible or unrecoverable. After startup (step a), the AN 42 sends a broadcast message (e.g., Broadcast_AN_Info) to all other ANs 42 in the subnet 60 to announce its availability (step b). Because the session database was inaccessible or otherwise unrecoverable, the AN 42 starts up in the UATI Inactive state. In this case, the other ANs 42 in the subnet 60 add the newly started AN 42 to their local databases and record this state of the newly started AN 42 (step c). The newly started AN 42 may be selected by the monitoring algorithm shown in FIG. 17, but may not be selected as a primary AN. Normally, all A10 connections that were anchored at the anchor node when it was shut down would be moved by the respective primary nodes upon receipt of the broadcast message signaling the shutdown, as shown in FIG. 17 block 162 and FIG. 20, step d. However, if the multicast message signaling the shutdown was not received, the primary nodes will establish the A10 connections upon receipt of a broadcast message signaling that the node has become available again. In other words, if the AN 42 is being restarted after being shutdown, the ANs 42 receiving the broadcast message from the newly started AN 42 will also establish new A10 connections for any active sessions for which the newly started AN served as the anchor AN (step d) prior to being shut down. The new A10 connections are established by the ANs 42 serving as the primary ANs for the corresponding sessions previously anchored by the newly started AN 42. After a predetermined time period has expired, the newly started AN 42 will transition from the UATI Inactive to the UATI active state and send a broadcast message to the other ANs 42 to announce the change in state (step e). The other ANs 42 update their local databases to reflect the change in state (step f). At this point, the new AN 42 is available for selection as a primary AN.

Figure 20:
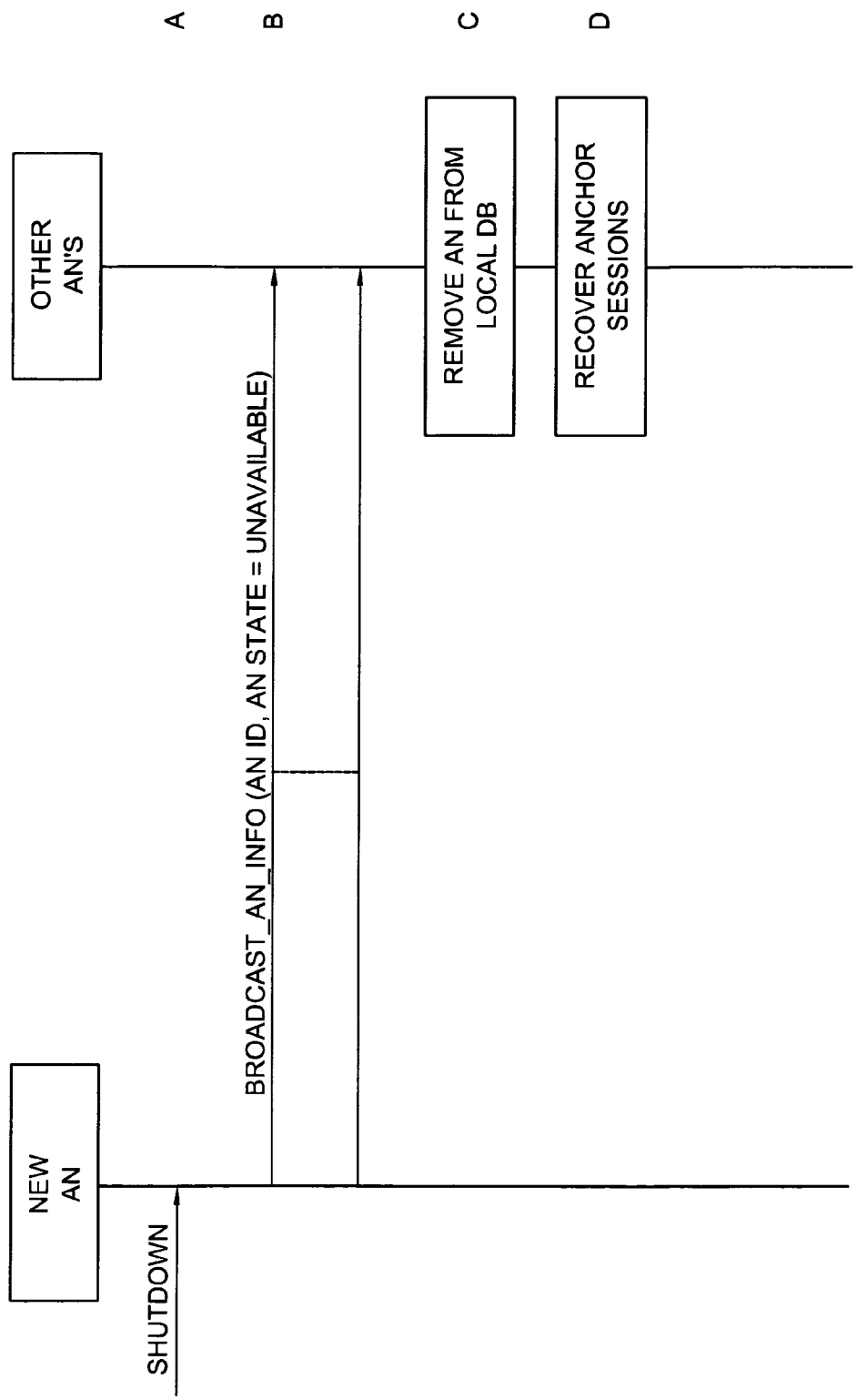
FIG. 20 illustrates an exemplary shut-down procedure.

FIG. 20 illustrates a shut down procedure for shutting down an AN 42. When the AN 42 receives an instruction to shut down (step a), it transmits a broadcast message (e.g., Broadcast_AN_Info) to all other ANs 42 to announce that it is shutting down. For example, the broadcast message may include a state variable set to "Unavailable." The other ANs 42 in the subnet 60 update their local databases to reflect that the AN 42 being shut down is unavailable (step c). This may be accomplished by removing the AN 42 from the local database, or by recording the new state (i.e., Unavailable) of the AN 42 in the local database. The nodes acting as primary nodes for sessions anchored at the node being shut down, establish the A10 connections corresponding to those sessions (step d).

In the distributed network described above, the mobile station 100 keeps its assigned UATI for the lifetime of an HRPD session unless it moves out of the subnet. The problem of UATI pool exhaustion in an AN close to an airport is mitigated, since the UATI assignment is distributed to all ANs in the subnet. The task of moving A10 connections when an anchor RBS becomes unavailable is distributed to many ANs in the subnet 60. There is no need to move A10 connections when an AN becomes available. It is also possible to add and remove an AN from a subnet 60 with no bulk moving of sessions from one AN to another. Many of the exemplary procedures also provide "self-healing" properties to the network.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method implemented by an access node in a radio access network comprising a plurality of access nodes that communicate with a mobile terminal over an air interface, said method comprising:
   establishing a session with a mobile station;
   establishing a connection with a core network to become an anchor node for said session with the mobile terminal; and
   as part of establishing said session with the mobile station, selecting another access node in said network to act as a primary node for storing session information for the session with the mobile terminal.

2. The method of claim 1 further comprising:
   requesting allocation of a mobile station identifier by said primary node for use by said mobile station during said session;
   receiving said requested mobile station identifier from said primary node;
   sending said mobile station identifier to said mobile station; and
   transferring session information for said session to said primary node for storage at said primary node during said session.

3. The method of claim 2 further comprising storing at least a portion of said session information at said anchor node.

4. The method of claim 3 further comprising:
   receiving notification that a previously unavailable primary node is available; and
   synchronizing session information stored at said anchor node and said primary node responsive to said notification.

5. The method of claim 1 further comprising periodically synchronizing session information stored at said anchor node with session information stored at said primary node.

6. The method of claim 1 further comprising synchronizing session information stored at said anchor node with session information stored at said primary node responsive to an update of said session information at one of said anchor node and primary node.

7. The method of claim 1 further comprising transferring buffered data for said mobile station to a new anchor node responsive to a handover.

8. The method of claim 4 further comprising storing location information for said mobile station at said primary node and said anchor node.

9. The method of claim 8 further comprising synchronizing said location information stored at said primary node and said anchor node responsive to a location update.

10. The method of claim 1 wherein the primary node is selected randomly from a group of access nodes.

11. An access node in a radio access network comprising a plurality of access nodes, said access node comprising:
    a transceiver system for communicating with a mobile station over an air interface; and
    a control circuit comprising a session controller and packet control function configured to:
       establish a communication session with a mobile station;
       establish a connection with a core network to become an anchor node for said communication session; and
       select another access node in said network to act as a primary node for storing session information related to said session.

12. The access node of claim 11 wherein the control circuit is further configured to:
    request allocation of a mobile station identifier by said primary node for use by said mobile station during said session;
    receive said requested mobile station identifier from said primary node;
    send said mobile station identifier to said mobile station; and
    transfer session information for said session to said primary node for storage at said primary node during said session.

13. The access node of claim 12 further comprising storing at least a portion of said session information at said anchor node.

14. The access node of claim 13 wherein the control circuit is further configured to synchronize session information stored at said anchor node and said primary node responsive to notification that a previously unavailable primary node is available.

15. The access node of claim 11 wherein the control circuit is further configured to periodically synchronize session information stored at said anchor node with session information stored at said primary node.

16. The access node of claim 11 wherein the control circuit is further configured to synchronize session information stored at said anchor node with session information stored at said primary node responsive to an update of said session information at one of said anchor node and primary node.

17. The access node of claim 11 wherein the control circuit is further configured to transfer buffered data for said mobile station to a new anchor node responsive to a handover.

18. The access node of claim 14 wherein the control circuit is further configured to store location information for said mobile station at said primary node and said anchor node.

19. The access node of claim 18 wherein the control circuit is further configured to synchronize said location information stored at said primary node and said anchor node responsive to a location update.

20. The access node of claim 11 wherein the control circuit selects the primary node randomly from a group of access nodes.

21. A method implemented by an access nodes in a radio access network comprising a plurality of access nodes that communicate with a mobile terminal over an air interface, session said method comprising:
receiving a request for a mobile station identifier from another access node serving as an anchor node for a mobile station during a communication session;
allocating a mobile station identifier to a mobile station to use during said communication session to become a primary node;
receiving session information from said anchor node for said communication session; and
storing said session information at said primary node.

22. The method of claim 21 further comprising receiving a session information request from a connecting node, and sending session information for said communication session to said connecting node.

23. The method of claim 22 further comprising sending an anchor transfer message to another access node serving as an anchor node responsive to said session information request.

24. The method of claim 21 further comprising:
receiving notification that an access node serving as a anchor node is unavailable; and
establishing a connection with a core network to become an new anchor node for said communication session.

25. The method of claim 21 further comprising:
receiving notification that an access node serving as a anchor node is unavailable;
selecting another access node to become a new anchor node for said communication session; and
sending a handoff message to said new anchor node to initiate connection establishment between said new anchor node and a core network.

26. The method of claim 21 further comprising:
sending a notification message to an access node serving as an anchor node when the status of said access node changes from unavailable to available; and
synchronizing session information stored at said primary node with session information stored at said anchor node.

27. The method of claim 21 further comprising:
receiving a route update message at said primary node indicating that the location of the mobile station has changed; and
synchronizing session information stored at said primary node with session information stored at said anchor node.

28. An access node in a mobile communication network comprising a plurality of access nodes, said access node comprising:
a transceiver system for communicating with a mobile station over an air interface; and
a control circuit comprising a session controller and packet control function configured to:
receive a request for a mobile station identifier from another access node serving as an anchor node for a mobile station during a communication session;
allocate a mobile station identifier to a mobile station to use during said communication session to become a primary node;
receive session information from said anchor node for said communication session; and
store said session information at said primary node.

29. The access node of claim 28 wherein the control circuit is further configured to receive a session information request from a connecting node, and to send session information for said communication session to said connecting node.

30. The access node of claim 29 wherein the control circuit is further configured to send an anchor transfer message to another access node serving as an anchor node responsive to said session information request.

31. The access node of claim 28 wherein the control circuit is further configured to establish a connection with a core network to become a new anchor node for said communication session responsive to notification that an access node serving as a anchor node is unavailable.

32. The access node of claim 28 wherein the control circuit is further configured to:
receive notification that an access node serving as a anchor node is unavailable;
select another access node to become a new anchor node for said communication session; and
send a handoff message to said new anchor node to initiate connection establishment between said new anchor node and a core network.

33. The access node of claim 28 wherein the control circuit is further configured to:
send a notification message to an access node serving as an anchor node when the status of said access node changes from unavailable to available; and
synchronize session information stored at said primary node with session information stored at said anchor node.

34. The access node of claim 28 wherein the control circuit is further configured to:
receive a route update message at said primary node indicating that the location of the mobile station has changed; and
synchronize session information stored at said primary node with session information stored at said anchor node.

* * * * *

UNITED STATES PATENT AND TRADEMARK OFFICE
CERTIFICATE OF CORRECTION

PATENT NO. : 8,248,915 B2  
APPLICATION NO. : 11/323321  
DATED : August 21, 2012  
INVENTOR(S) : Baglin et al.

Page 1 of 1

It is certified that error appears in the above-identified patent and that said Letters Patent is hereby corrected as shown below:

In Column 7, Line 39, delete "(step 1)." and insert -- (step l). --, therefor.

In Column 10, Line 19, delete "(step 1)." and insert -- (step l). --, therefor.

Signed and Sealed this  
Fifth Day of February, 2013

Teresa Stanek Rea  
*Acting Director of the United States Patent and Trademark Office*